US007425996B2

(12) United States Patent
Ando

(10) Patent No.: US 7,425,996 B2
(45) Date of Patent: Sep. 16, 2008

(54) IMAGE FORMING APPARATUS AND VIDEO RECEIVING AND DISPLAY APPARATUS

(75) Inventor: Muneki Ando, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 11/242,828

(22) Filed: Oct. 5, 2005

(65) Prior Publication Data

US 2006/0072043 A1 Apr. 6, 2006

(30) Foreign Application Priority Data

Oct. 6, 2004 (JP) ............................ 2004-293275

(51) Int. Cl.
*H04N 3/14* (2006.01)

(52) U.S. Cl. ....................................... 348/790; 348/792

(58) Field of Classification Search ................. 348/739, 348/790–793, 800–803; 345/690, 204, 33, 345/37–39, 44–48, 50, 55, 84, 87, 89; *H04N 5/66, H04N 9/12, 3/14, 9/30, 5/70*
See application file for complete search history.

(56) References Cited

U.S. PATENT DOCUMENTS 5,347,294 A * 9/1994 Usui et al. .................. 348/790
5,898,414 A * 4/1999 Awamoto et al. ........... 348/792
6,100,939 A 8/2000 Kougami et al. ............ 348/687
6,333,766 B1 12/2001 Kougami et al. ............ 348/687

FOREIGN PATENT DOCUMENTS

JP 09-083911 3/1997
JP 2002-169515 6/2002
JP 2004-219884 8/2004

* cited by examiner

*Primary Examiner*—Sherrie Hsia
(74) *Attorney, Agent, or Firm*—Fitzpatrick, Cella, Harper & Scinto

(57) ABSTRACT

A control circuit of an image display apparatus controls an output of video signals so that a non-display period TC set between an end of display of images corresponding to a first input video signal for one vertical scan and a start of display of an image corresponding to a second input video signal for the next one vertical scan can satisfy a relationship:

$$TC>(TA-TB)/N,$$

where TA denotes a period between the start of the display of the images corresponding to the first input video signal and the start of the display of the image corresponding to the second input video signal,
TB denotes a sum of display periods for the respective images corresponding to the first input video signal, and
N denotes the number of the images corresponding to the first input video signal.

13 Claims, 19 Drawing Sheets

IMAGE FORMING APPARATUS AND VIDEO RECEIVING AND DISPLAY APPARATUS

BACKGROUND OF THE INVENTION

1. Field of the Invention

The present invention relates to an image forming apparatus and a video receiving and display apparatus for displaying a plurality of images based on a video signal corresponding one image.

2. Description of the Related Art

A technique for displaying an image twice by performing two vertical scans on the image based on an input video signal corresponding to one frame so as to reduce flicker or a so-called double-speed display technique is disclosed in Japanese Patent Laid-Open No. 2004-219884.

An image display technique for emitting a light from a device so that a luminance time width in sub-fields is half a time width of the sub-fields (50% duty ratio) is disclosed in Japanese Patent Application Laid-Open No. H09-083911 (corresponding U.S. Pat. Nos. 6,100,939 and 6,333,766).

An image display technique for putting at least one non-display field between two frames and for approximating a display scheme to an impulse display scheme for securing a relatively long non-display time in frames is disclosed in Japanese Patent Application Laid-Open No. 2002-169515.

A video signal refresh rate of an ordinary television broadcast is 50 Hz or 60 Hz. A screen on which video signals are displayed in this cycle often causes a flicker annoyance. The flicker annoyance is obtrusive particularly in a large-screen image display apparatus. To reduce the flicker, the double speed display method for displaying an image twice based on an original video signal corresponding to one frame, and for thereby converting a display refresh rate in to 100 Hz or 120 Hz is known. However, the following phenomena occur in this double speed display method.

To display a moving image in the image display apparatus, a "retinal afterimage" phenomenon is used. For example, if an object moves on a screen, user's eyes follow the object and an afterimage is formed at a fixed position of retina. If a motion of each eye (an expected position) coincides with a position of the object (a display position) at which the object is actually displayed on the screen, it appears as if the object smoothly moves. If a video signal is displayed at the ordinary refresh rate (50 to 60 Hz), the object display position coincides with the expected position and no problems occur as shown in FIG. 14.

According to the double-speed display method, the same image is displayed twice consecutively. Due to this, as shown in FIG. 15, the object position in the second displayed image (inserted image) is deviated from the expected position. As a result, the object is displayed as if it alternately repeats a moving state and a stationary state and the motion of the object appears artificial.

Further, a video signal at a refresh rate of 60 Hz 3-2 pulldown-converted from an original video signal at a refresh rate of 24 Hz is sometimes input to the image display apparatus. As shown in FIG. 16, in the 3-2 pulldown conversion method, an original video signal ($F_3$) corresponding to one frame is 3-2 pulldown-converted into video signals (F3-1, F3-2, and F3-3) corresponding to three frames. An original video signal (F4) corresponding to one frame is 3-2 pulldown-converted into video signals (F4-1 and F4-2) corresponding to two frames. As can be seen, the 3-2 pulldown-converted video signals corresponding to the frames of the original video signals differ in the number of frames. Similarly to the above, in the video displayed by the 3-2 pulldown-converted video signals, therefore, the display position does not coincide with the expected position on the screen and the motion of the object in the video disadvantageously appears artificial.

SUMMARY OF THE INVENTION

It is an object of the present invention to provide an image display apparatus and a video receiving and display apparatus that reduce an artificiality of a motion of an object generated when one image is displayed a plurality of times.

According to a first aspect of the present invention, there is provided an image display apparatus comprising:

a display panel that includes a plurality of pixels different in color, and that can display a multi-color and gray-scale image by one vertical scan;

a video signal output circuit that outputs video signals, for a plurality of images sequentially displayed by a plurality of vertical scans, corresponding to an input video signal for one vertical scan; and a control circuit that controls an output of the video signals so that a non-display period TC set between an end of display of a plurality of images corresponding to a first input video signal for one vertical scan and a start of display of an image corresponding to a second input video signal for a next one vertical scan can satisfy a relationship:

$$TC>(TA-TB)/N.$$

According to a second aspect of the present invention, there is provided an image display apparatus comprising:

a display panel that includes a plurality of pixels different in color, and that can form a multi-color and gray-scale image by displaying images each of which is displayed by one vertical scan, wherein each of images has a plurality of elements each of which has one of two levels of brightness;

a video signal output circuit that outputs video signals, for a plurality of multi-color and gray-scale images, corresponding to an input video signal for one vertical scan; and a control circuit that controls an output of the video signals so that a non-display period TC set between an end of display of a plurality of multi-color and gray-scale images corresponding to a first input video signal for one vertical scan and a start of display of a multi-color and gray-scale image corresponding to a second input video signal for a next one vertical scan can satisfy a relationship:

$$TC>(TA-TB)/N.$$

According to a third aspect of the present invention, there is provided an image display apparatus comprising:

a display panel that can display a monochrome image by one vertical scan, and that can form a multi-color and gray-scale image by displaying a plurality of monochrome images each of which has different color;

a video signal output circuit that outputs video signals for a plurality of multi-color and gray-scale images corresponding to an input video signal for one vertical scan; and a control circuit that controls an output of the video signals so that a non-display period TC set between an end of display of a plurality of multi-color and gray-scale images corresponding to a first input video signal for one vertical scan and a start of display of a multi-color and gray-scale image corresponding to a second input video signal for a next one vertical scan can satisfy a relationship:

$$TC>(TA-TB)/N.$$

In these cases,

TA denotes a period between the start of the display of the plurality of images corresponding to the first input video signal and the start of the display of the image corresponding to the second input video signal, TB denotes a sum of display periods for the respective plurality of images corresponding to the first input video signal, and N denotes the number of the plurality of images corresponding to the first input video signal.

According to a fourth aspect of the present invention, there is provided a video receiving and display apparatus comprising:

the above-mentioned image display apparatus; and a video information receiver apparatus that receives a video signal obtained through a wireless broadcasting, a wired broadcasting or the Internet, and that outputs the video signal to the image display apparatus.

DETAILED DESCRIPTION OF THE PREFERRED EMBODIMENTS (Configuration of Image Display Apparatus)

Figure 1:
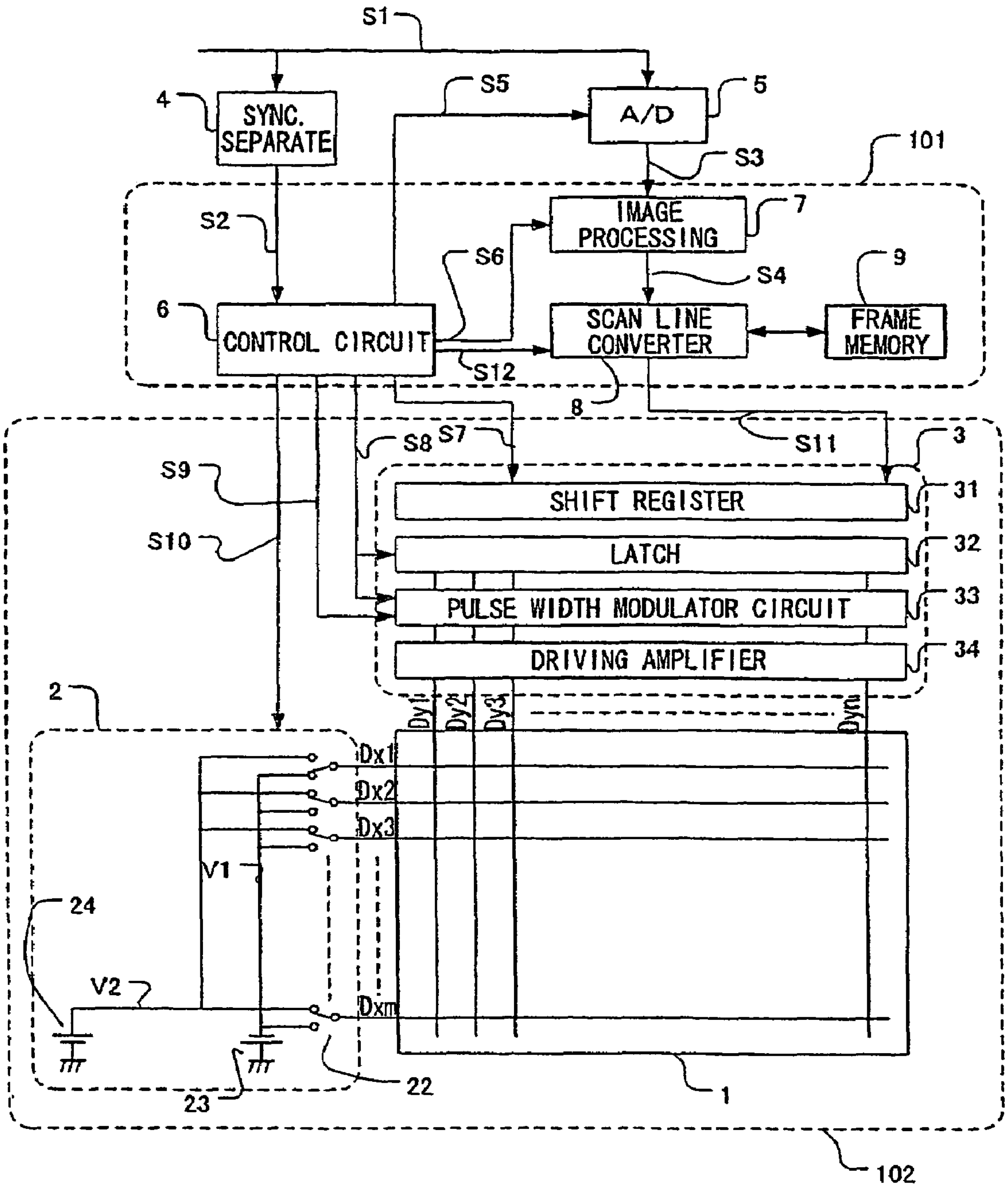
FIG. 1 is a block diagram that depicts a configuration of an image display apparatus according to embodiments of the present invention.

FIG. 1 depicts a configuration of an image display apparatus according to embodiments of the present invention. The image display apparatus includes an image signal generator circuit 101 and an image display unit 102. The image display apparatus also includes a synchronous separate unit 4 and an AD converter 5 if it is necessary to provide them.

The image signal generator circuit 101 includes a control circuit 6, an image processing unit 7, a scan line converter 8, and a frame memory 9. The control circuit 6 consists of a microcomputer, a logic circuit or the like. The scan line converter 8 is a circuit that converts a scan line structure of an input video signal. The frame memory 9 is a storage unit that temporarily stores the video signal. In the embodiments of the present invention, the control circuit 6 and the scan line converter 8 can be employed as a control circuit and a video signal output circuit, respectively.

The image display unit 102 includes a display panel 1, a scan driver 2, and a modulation driver 3. A detailed configuration of the display panel 1 will be described later. The scan driver 2 includes a switch 22, a selection voltage generating unit 23, and a non-selection voltage generating unit 24. The modulation driver 3 includes a shift register 31, a latch 32, a pulse width modulator circuit 33, and a driving amplifier 34.

The synchronous separate unit 4 separates a synchronous signal S2 from an analog video signal S1 input to the image display apparatus. The separated synchronous signal S2 is input to the control circuit 6. The control circuit 6 generates control signals S5 to S10 and S12, and supplies the control signals to respective units. The control signal S5 is a conversion timing signal supplied to the AD converter 5, and the control signal S6 is an image processing control signal for controlling the image processing unit 7. The control signal S7 is a video clock signal for controlling an operation of the shift register 31, and the control signal S8 is a modulation control signal for controlling an operation of the modulation driver 3. The control signal 9 is a PWM clock based on which the pulse width modulator circuit 33 operates, the control signal S10 is a scan control signal for controlling an operation of the scan driver 2, and the control signal S12 is an output control signal for controlling output of the video signal from the scan line converter 8 to the frame memory 9 and the modulation driver 3.

The AD converter 5 samples the analog video signal S1 according to the conversion timing signal 5, and generates a digital video signal S3. The image processing unit 7 performs image processing such as an image adjustment and a resolution conversion on the digital video signal S3. The image-processed video signal S4 is input to the scan line converter 8. The scan line converter 8 temporarily stores an image-processed video signal S4 corresponding to one frame in the frame memory 9. After a predetermined period, the scan line converter 8 reads data on each row from the frame memory 9 according to an order of applying a selection voltage V1 to scan wirings Dx1 to Dxm. The scan line converter 8 thereby performs a scan line conversion. A scan line-converted video signal S11 is output from the scan line converter 8 and input to the modulation driver 3. The image-processed video signal S4 and the scan line-converted video signal S11 will be referred to as "display signal S4" and "scan line converted signal S11" hereinafter, respectively.

(Configuration of Display Panel)

The present invention is suitably applicable to an image display apparatus including a plurality of pixels of different colors and capable of displaying a multi-color and gray-scale image by one vertical scan. The "displaying a multi-color image" means display in which the pixels constituting one image can express different colors, respectively. The "displaying a gray-scale image" means display in which the respective pixels constituting one image can express three or more tones to correspond to a video signal for which three or more levels of tones are designated. The "displaying a gray-scale image" means displaying not only a mono-color gray-scale image but also a multi-color and gray-scale image.

The present invention is also suitably applicable to an image display apparatus capable of displaying a multi-color and gray-scale image by combining images each displayed by one vertical scan and each having one of two levels of brightness by a plurality of times of vertical scans, wherein a multi-color and gray-scale image corresponding to an input video signal corresponding to one vertical scan and displayed a plurality of times is displayed based on the input video signal corresponding to one vertical scan. For example, the present invention is applicable to a so-called sub-field method that is a plasma display panel (PDP) driving method.

Furthermore, the present invention is also suitably applicable to an image display apparatus capable of displaying a monochrome image by one vertical scan and displaying a multi-color and gray-scale image by combining the monochrome images by performing a plurality of vertical scans, wherein a multi-color and gray-scale image corresponding to an input video signal corresponding to one vertical scan and displayed a plurality of times is displayed based on the input video signal corresponding to one vertical scan. For example, the present invention is applicable to a so-called color sequential method that is a driving method for a liquid crystal display or the like.

Examples of the image display apparatus to which the present invention can be applied include a field emission display (FED), a plasma display panel (PDP), an electroluminescence display (EL device), and a liquid crystal display (LCD) that makes impulse display. Among them, the present invention can be particularly preferably applied to the FED.

Figure 2:
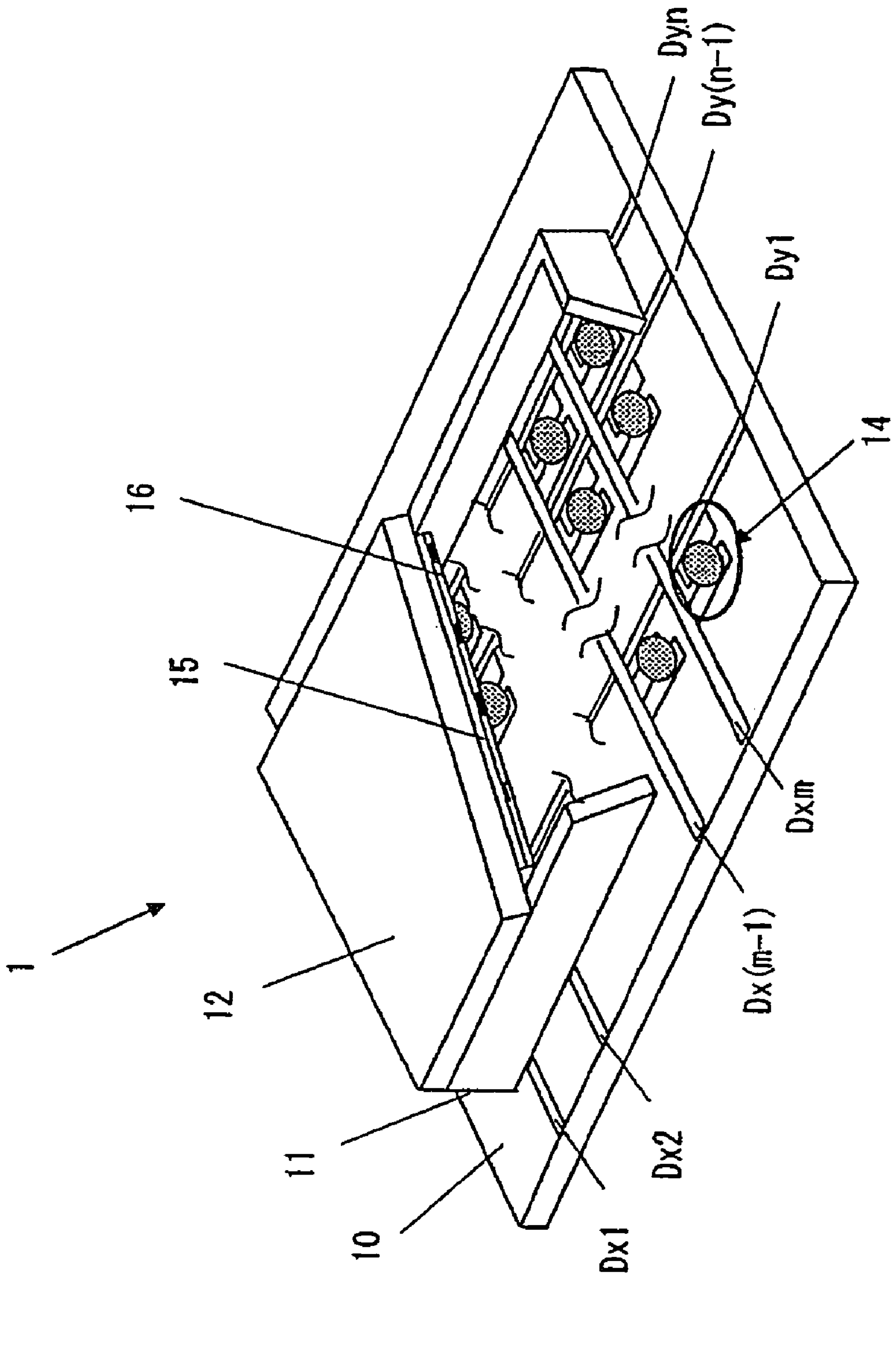
FIG. 2 is a perspective view of a display panel.

FIG. 2 is a perspective view of the display panel 1 of the field emission display to which the present invention can be applied. In FIG. 2, a part of the panel 1 is cut out to show an internal structure of the panel 1. In the display panel 1, a rear plate 10, a sidewall 11, and a face plate 12 form an airtight container for keeping an interior of the panel 1 vacuum.

Figure 3:
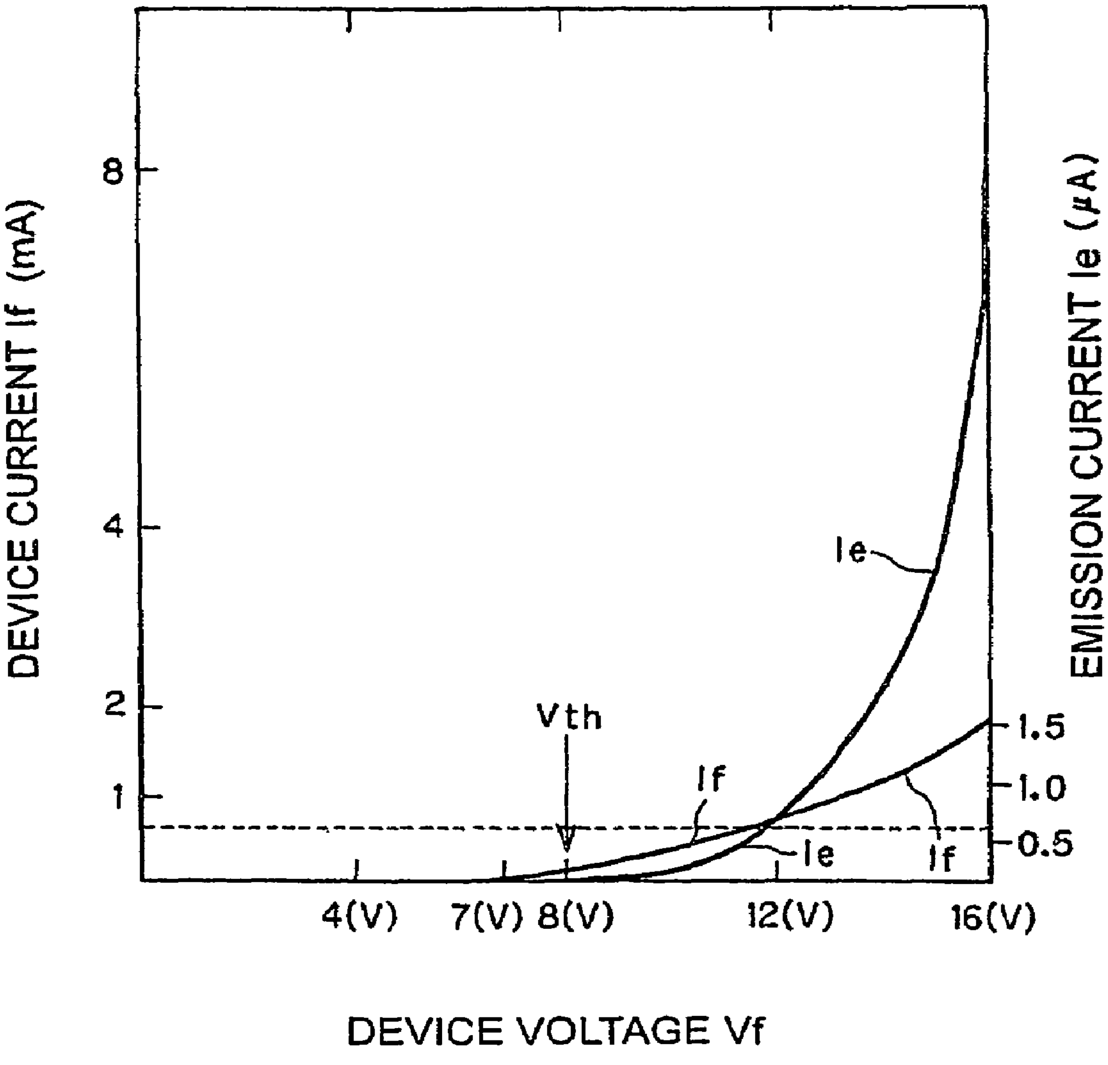
FIG. 3 is a chart that depicts current-voltage characteristics of an electron-emitting device.

On the rear plate 10, nxm electron emitters (electron emitting devices) 14 such as cold cathode electron emitters or surface-conduction electron emitters using carbon fibers are formed. The electron emitter 14 includes a pair of electrodes to which a scan wiring in a row direction and a modulation wiring in a column direction are connected, respectively. By applying a voltage between the electrodes of the electron emitter 14 via the scan wiring and the modulation wiring, electrons are emitted. Current-voltage characteristics of the electron emitter 14 are nonlinear characteristics shown in FIG. 3. In FIG. 3, Vf denotes an device voltage applied between the electrodes, If denotes an device current carried between the electrodes, and Ie denotes an emission current applied between the electron emitter 14 and a metal back 16 to be described later. In the example shown in FIG. 3, the emission current Ie is generated when the emitter voltage higher than a threshold voltage Vth is applied between the electrodes.

A fluorescent screen 15 is provided on a rear plate 10-side surface of the face plate 12. The image display apparatus according to the embodiments of the present invention is a color image display apparatus. Therefore, the fluorescent screen 15 is formed by coating fluorescent substances of three primary colors of red, green, and blue (not shown). The fluorescent screen 15 is arranged according to positions at which electrons emitted from the respective electron emitters 14 on a substrate 13 are irradiated. Each of a monochrome fluorescent substance is referred to as "one pixel".

A metal back 16 that is a conductive member is formed on a rear plate 10-side surface of the fluorescent screen 15. If a high voltage is applied to the metal back 16, a potential difference is generated between the rear plate 10 and the face plate 12. This potential difference causes the electrons emitted from the electron emitters 14 to be accelerated and struck against the fluorescent screen 15. As a result, the fluorescent substances emit lights and a color image can be formed.

(Display Panel Driving Method)

A method for driving the display panel 1 configured as stated above will be described.

The scan driver 2 scans scan wirings in the row direction for every row or a plurality of rows according to the scan control signal S10. To scan the scan wirings for every row, the scan driver 2 applies the selection voltage V1 to an $i^{th}$ scan wiring Dxi to make the $i^{th}$ scan wiring selected, and applies an non-selection voltage V2 to remaining scan wirings Dxk ($k=1, 2, \ldots, m$; where $k \neq i$) to make the scan wirings Dxk unselected. The selection voltage V1 may be set to, for example, −8 volts that is lower than the threshold voltage Vth and the non-selection voltage V2 may be set to, for example, a ground potential. The modulation driver 3 generates a pulse width modulation signal (which is a signal outputting either a potential Vpwm or the ground potential) having a voltage amplitude Vpwm based on the scan line conversion signal S11 corresponding to one row. The modulation driver 3 then supplies the pulse width modulation signal to voltage supply terminals of all modulation wirings Dyj (j=1 to n). The potential Vpwm may be set to, for example, +8 volts.

The electron emitters connected to the scan wirings applied with the non-selection voltage V2 do not emit electrons even if connected to the modulation wirings to which the pulse width modulation signal at the potential Vpwm is applied.

The electron emitters connected to the scan wiring applied with the selection voltage V1 emit electrons according to a period in which the pulse width modulation signal has the potential Vpwm. In the period in which the pulse width modulation signal has the ground potential, the voltage applied to both ends of the electron emitters connected to the selected scan wiring is V1. These electron emitters, therefore, do not emit electrons. The emitted electrons are struck against the fluorescent substances to thereby emit lights from the fluorescent substance. An emission luminance of each fluorescent substance is substantially proportional to a quantity of emitted electron beams. In the case of pulse width modulation, therefore, the luminance can be adjusted by the pulse width (electron emission time) of the modulation signal.

A vertical scan (interlace scan or progressive scan) is performed by supplying modulation signals corresponding to selected rows to the modulation wirings while sequentially switching over the scan wirings to be applied with the selection voltage V1. One image plane is constituted by a plurality of display lines. This driving technique is referred to as "line sequential scan and pulse width modulation".

The structure of the display panel 1 in which the electron emitters are arranged in a simple matrix and the method for driving the display panel 1 by the line sequential scan and pulse width modulation have been described. However, the present invention is suitably applicable to the pulse amplitude modulation or a combination of the pulse width modulation and the pulse amplitude modulation. Thus, the respective pixels enable gray-scale display.

Moreover, the present invention is applicable to a field sequential scan image display apparatus that emit lights from pixels in a region in which the image is displayed simultaneously.

(Display Method)

A display method for the image display apparatus is roughly divided into a display method using an interlace scan and a display method using a non-interlace scan.

According to the interlace scan method, images displayed based on image signals of scan lines in even numbered rows and those displayed based on image signals of scan lines in odd numbered rows are alternately displayed. An image displayed from an image signal of a scan line in each even numbered row is referred to as "even numbered field", and an image displayed from an image signal of a scan line in each odd numbered row is referred to as "odd numbered field". According to the interlace scan method, therefore, a one-field image is displayed by one vertical scan. Further, an image displayed based on the image signal of the scan line in each even numbered row or an image displayed based on the image signal of the scan line in each odd numbered row is referred to as "sub-field".

According to the non-interlace scan method, an image is displayed by displaying all scan lines. This image is referred to as "one frame". According to the non-interlace scan method, therefore, a one-frame image is displayed by one vertical scan. If a plurality of images are displayed by a plurality of vertical scans based on a non-interlace video signal corresponding to one frame, those images are referred to as "sub-frames".

The display refresh rate represents the number of images displayed for one second and corresponds to the number of vertical scans per second. The video signal refresh rate is a refresh rate required by a video signal. If the video signal is an NTSC signal, a PAL signal, a 60*p* signal, or a 60*i* signal, the video signal refresh rate is 60 Hz, 50 Hz, 60 Hz, or 60 Hz, respectively. If a video signal obtained by, for example, IP-converting the NTSC signal into a 30*p* signal is used, the video signal refresh rate of the video signal is 30 Hz.

The "one vertical scan" means one display processing. In the case of the line sequential scan driving, one display processing means a processing for driving from the first scan wiring to the last scan wiring. In the case of field sequential scan driving, one display processing means a processing for driving the image display apparatus to substantially emit lights from the pixels constituting an image and to substantially finish emitting lights from the pixels constituting the image.

According to the non-interlace scan method, one frame is displayed by one vertical scan. According to the interlace scan method for which one frame consists of even numbered fields and odd numbered fields, one field is displayed by one vertical scan.

(Display Timing Control)

The image display apparatus according to the embodiments of the present invention converts an input video signal for one vertical scan, outputs video signals of a plurality of images corresponding to the input video signal for one vertical scan and sequentially displayed by a plurality of vertical scans, and displays images based on the output video signals. Embodiments of the display operation are as follows.

(1) If a non-interlace video signal is input, then the image display apparatus converts (divides) an input video signal corresponding to one frame into a video signal corresponding to an even numbered field and a video signal corresponding to an odd numbered field, and displays an image based on the converted video signals corresponding to the respective fields by the interlace scan method.

(2) If a non-interlace video signal is input, then the image display apparatus converts (duplicates) an input video signal corresponding to one frame into video signals corresponding to a plurality of sub frames, and displays an image based on the converted video signals corresponding to the respective sub fields by the non-interlace scan method.

(3) If an interlace video signal is input, then the image display apparatus converts (duplicates) an input video signal corresponding to one field into video signals corresponding to a plurality of sub fields, and displays an image based on the converted video signals corresponding to the respective sub fields by the interlace scan method.

(4) If an interlace video signal is input, then the image display apparatus converts (combines) input video signals corresponding to a plurality of fields into a video signal corresponding to one frame, converts (duplicates) the video signal corresponding to one frame into video signals corresponding to a plurality of sub frames, and displays an image based on the converted video signals corresponding to the plurality of sub frames by the non-interlace scan method.

(5) If an interlace video signal is input, then the image display apparatus converts (combines) input video signals corresponding to a plurality of fields into a video signal corresponding to one frame, converts (divides) the video signal corresponding to one frame into video signals corresponding to a plurality of sub fields, and displays an image based on the video signals corresponding to the plurality of sub fields by the interlace scan method.

(6) If video signals obtained by converting (duplicating) an original video signal corresponding to one frame into video signals corresponding to N (where N is an integer) frames are input, the image display apparatus displays an image corresponding to the input video signals corresponding to N frames based on video signals corresponding to M (where M is an integer) frames that are fewer than the N frames. For example, in the case of 3-2 pulldown-converted video signals in which video signals corresponding to three frames and video signals corresponding to two frames are alternately arranged, the original video signal corresponding to one frame is duplicated into video signals corresponding to three or two frames. Therefore, if the 3-2 pulldown-converted video signals are input, the image display apparatus selects the video signals corresponding to two frames from among the input video signals corresponding to three frames, and sequentially displays images corresponding to the video signals corresponding to three frames by two vertical scans. In addition, the image display apparatus sequentially displays images corresponding to the video signals corresponding to two frames among the input video signals by two vertical scans.

(7) If video signals obtained by converting (duplicating) an original video signal corresponding to one frame into video signals corresponding to a plurality of frames are input, the image display apparatus extracts only one frame from the plurality of frames corresponding to the original video signal corresponding to one frame, thereby inversely converts the video signals into the original video signal, and performs one of the processings described in (1) to (5) on the inversely-converted video signal.

In each of these embodiments, the video signal for one vertical scan is converted into a plurality of video signals of a plurality of images to be sequentially displayed by a plurality of vertical scans. As a result, a plurality of images are repeatedly displayed. Due to this, if a plurality of images are simply displayed at time series, there is a probability that the motion of the object appears artificial.

In the image display apparatus according to the embodiments, therefore, the control circuit 6 controls the output of the video signal or video signals as follows. The control circuit 6 controls the output of the video signal or video signals so that a non-display period TC set between an end of display of a plurality of images corresponding to a first input video signal for one vertical scan and a start of display of an image corresponding to a second input video signal for the next one vertical scan can satisfy the following relationship.

$$TC>(TA-TB)/N$$

In the expression, "TA" denotes a period between a start of display of (a first image of) the plurality of images corresponding to the first input video signal and a start of display of the image corresponding to the second input video signal. "TB" denotes a sum of respective display periods for a plurality of images corresponding to the first input video signal. "N" denotes the number of a plurality of images corresponding to the first input video signal.

In other words, the control circuit 6 controls the output of the video signal or video signals so that the non-display period TC can satisfy the following relationship.

$$TC>TC12,\ TC23,\ \ldots,\ TC(N-1)N$$

In the expression, TCx (x+1) denotes a time interval between an end of display of an $x^{th}$ image among a plurality of images corresponding to the first input video signal and a start of display of an $(x+1)^{th}$ image. TC12, TC23, . . . , TC(N−1)N may be the same interval or different intervals. If TCx(x+1) >0, this indicates that a non-display period is present between the two images (hereinafter, TCx(x+1) and TC will be referred to as "first non-display period" and "second non-display period", respectively). If TCx(x+1)=0, this indicates that the two images are displayed consecutively.

Thus, image moving characteristics of the image display method according to the present invention is improved, as compared with those of the conventional double-speed display method. The explanation of which will be found below.

Figure 19:
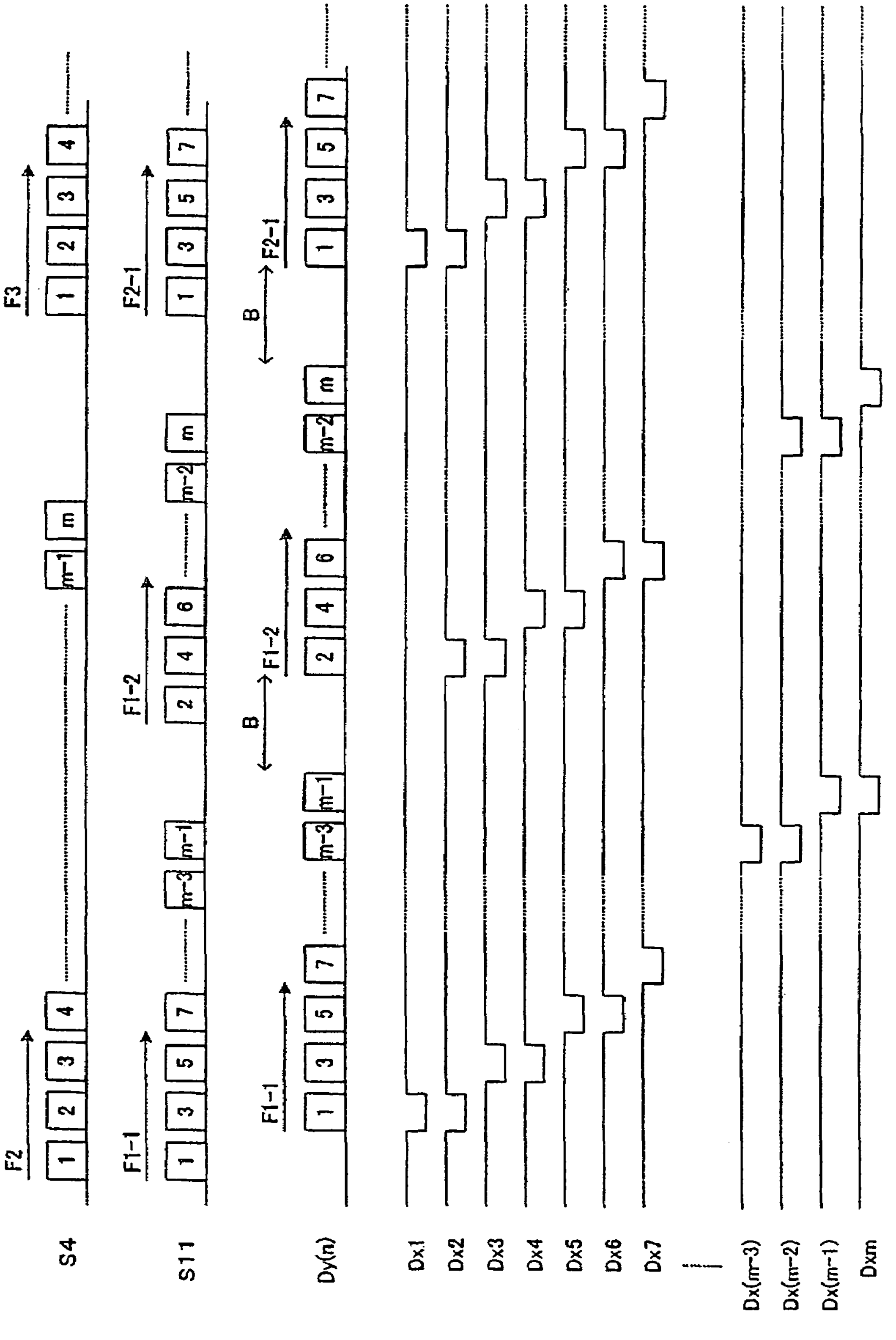
FIG. 19 is a timing chart that depicts a display timing control in the conventional double-speed display.

A timing chart that depicts a display timing control in the conventional double-speed display will be described with reference to FIG. 19. The timing chart of FIG. 19 represents timings of video signals if the timing control is exercised to enable the conventional double-speed display in an image display apparatus according to the embodiment of the invention shown in FIG. 1. In FIG. 19, S4 denotes a display signal before a scan line conversion and S11 denotes a scan line-converted signal after the scan line conversion. In addition, Dy(n) denotes a modulation signal, and Dx1 to Dx(m) denote scan signals applied to respective scan wirings. A number written in a rectangle of each of the signals S4, S11, and Dy(n) represents a scan wiring number, and indicates that a signal in a row corresponding to the scan wiring allocated the number is input during this rectangular period. For the scan signals Dx1 to Dx(m), the selection voltage V1 or the non-selection voltage V2 is supplied. The selection voltage V1 is lower than the non-selection voltage V2. The same thing is true for timing charts of FIGS. 7 to 10 and FIG. 12 to be described later.

Figure 15:
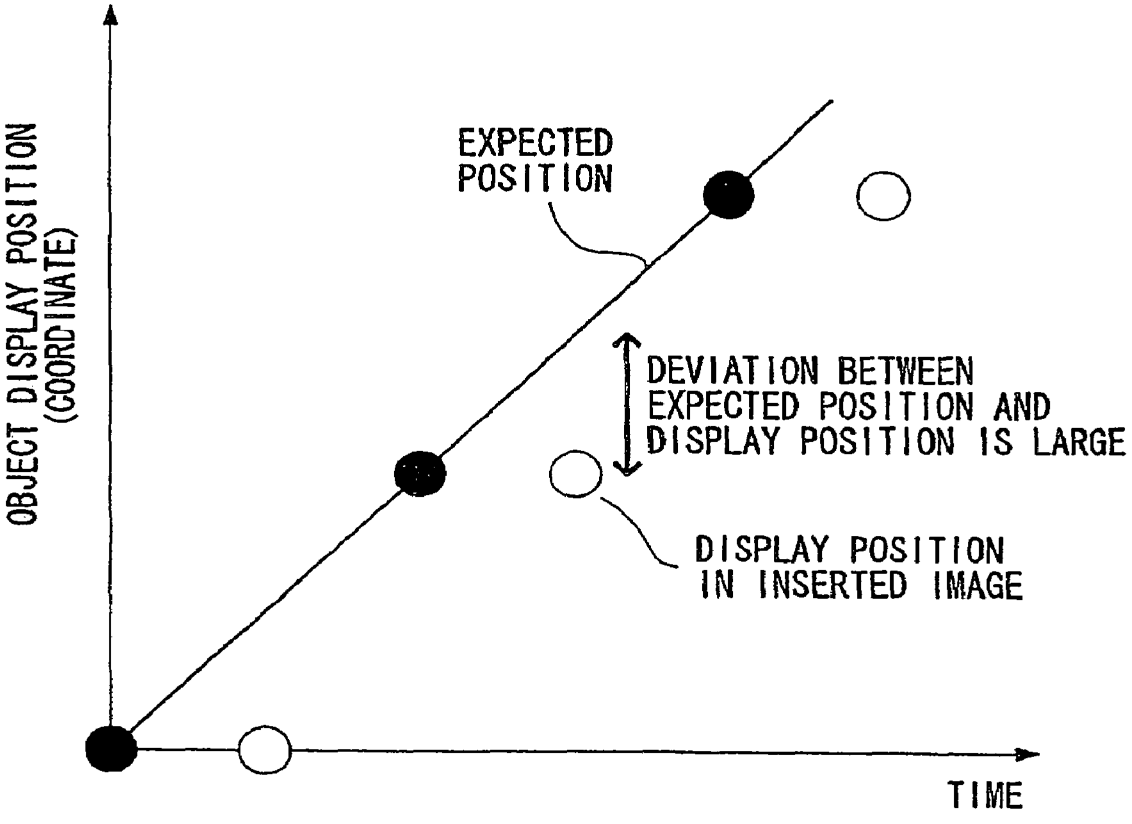
FIG. 15 is a chart that depicts the relationship between the display position and the expected position in a conventional double-speed display.
Figure 16:
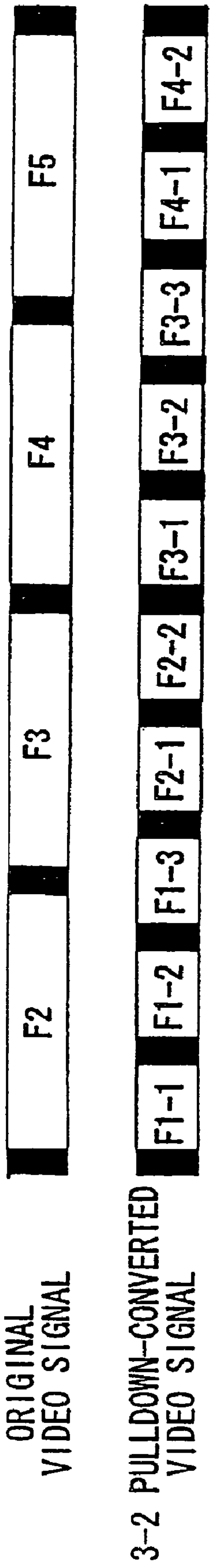
FIG. 16 depicts 3-2 pulldown conversion.

According to the conventional double-speed display method, the first non-display period TC12 (non-display period between an image corresponding to a field (F1-1) and an image corresponding to a field (F1-2)) and the second non-display period TC (non-display period between an image corresponding to a field (F1-2) and an image corresponding to a field (F2-1)) are equally B. As shown in FIG. 15, therefore, the images are displayed at equal intervals. Due to this, the position of the object in the displayed image is deviated from the expected position of the object, and the motion of the object sometimes appears artificial.

According to the present invention, by contrast, the second non-display period TC is set longer than the first non-display period TCx(x+1) (including a case of TCx (x+1)=0. Namely, the display timing is controlled so that the display interval of a plurality of images corresponding to the first input video signal is narrower than the interval between the last image corresponding to the first input video signal and the first image corresponding to the second input video signal. By so controlling, the deviation between the expected position of the moving object and the position at which the object is actually displayed as an image is reduced, and the artificiality of the motion of the object is reduced.

In the present invention, the non-display period means a period in which lights are not emitted from any pixels constituting the image or a period in which an image in black or a color equivalent to black (e.g., blackish gray) is displayed.

In the image display apparatus according to the present invention, if lights are not emitted from any pixels constituting the image, a display screen of the image display apparatus turns black. Therefore, then on-display period can be also paraphrased into the period in which the display screen of the image display apparatus turns black.

According to the method for displaying the image by line sequential scan, non-light-emission time is sometimes generated since light is emitted from the selected scan line until light is emitted from the next scan line. According to the present invention, however, the non-light-emission time is not included in the non-display period.

According to the present invention, the start of the display of an image means a moment when a part of the image plane for forming the image, from which part light emission (substantial light emission for forming the image plane) is started. In the present specification, the term "light emission" is also used for an image display apparatus, such as a liquid crystal display apparatus, configured to irradiate a light on an device which does not emit light itself to modulate the light. In that case, emitting the light modulated by an optical modulation device to the outside is referred to the "light emission". In addition, the end of the display of an image means a moment when light emission on the image plane for forming the image (substantial light emission for forming the image plane) is finished. The "substantial light emission for forming the image plane" does not include, for example, light emission by maintaining discharge of a plasma display device and emission of a background light such as a leakage light from the liquid crystal display device. Further, if the image is substantially displayed only in a partial region (substantial display region) of a displayable region of the image display apparatus, light emission outside the substantial display region is not included in the "substantial light emission for forming the image plane". Specifically, in a display apparatus including the displayable region having an aspect ratio of 4:3, gray is displayed in one of or both of an upper portion and a lower portion of the displayable region and the image is displayed at an aspect ratio of 16:9, the gray display is not included in the "substantial light emission for forming the image plane".

By thus controlling the display timing, the deviation between the display position of the object displayed on the image plane and the expected position can be reduced and the artificiality of the motion of the object can be reduced, as compared with the instance in which a plurality of images are simply displayed at time series.

Besides, by converting the original video signal for one vertical scan into the video signals of N images sequentially displayed by N vertical scans and sequentially displaying the images, the display refresh rate is accelerated. The flicker can be advantageously reduced. The effect of the reduction of flicker is obtrusive if the video signal refresh rate is lower than 70 Hz (that is, flicker is apt to be generated). It is noted, however, the present invention is suitably applicable even to a video signal the video signal refresh rate of which is equal to or higher than 70 Hz.

To simplify driver configurations and to improve the motion of the moving object, the number (N) of vertical scans corresponding to the original video signal for one vertical scan is preferably as small as possible. Most preferably, images are displayed by two vertical scans to correspond to the original video signal for one vertical scan.

According to the present invention, the display periods of the respective N images corresponding to the video signal for one vertical scan may differ from one another. It is, however, preferable that display periods of the respective N images are equal so as to simplify the driver configurations.

Preferred embodiments of the display timing control will be described in detail.

First Embodiment

In a first embodiment, an input non-interlace video signal corresponding to one frame is divided into video signals corresponding to two fields and the video signals corresponding to the respective fields are displayed by the interlace scan.

Figure 4:
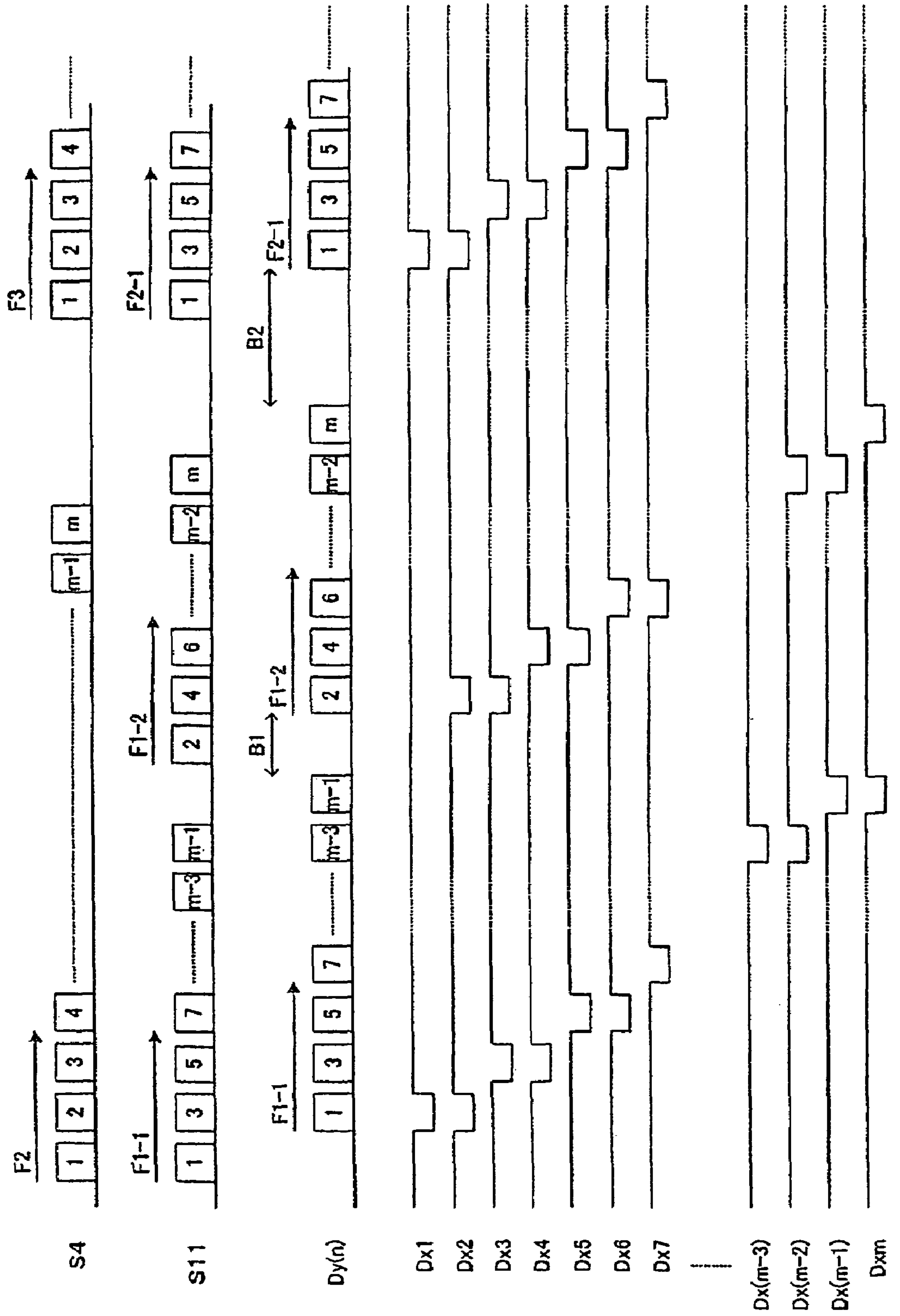
FIG. 4 is a timing chart that depicts a display timing control according to a first embodiment of the present invention.

FIG. 4 is a timing chart that depicts a display timing control according to this embodiment.

The scan line converter 8 temporarily stores the display signal S4 of a non-interlace structure in the frame memory 9, sequentially reads data corresponding to each row from the frame memory 9 in order of (1, 3, 5, 7, . . . , 2, 4, 6, 8, . . . ) by a delay by as much as one frame, and outputs the data as the scan line converted signal S11. The scan lines are thereby converted into an interlace structure.

Figure 5:
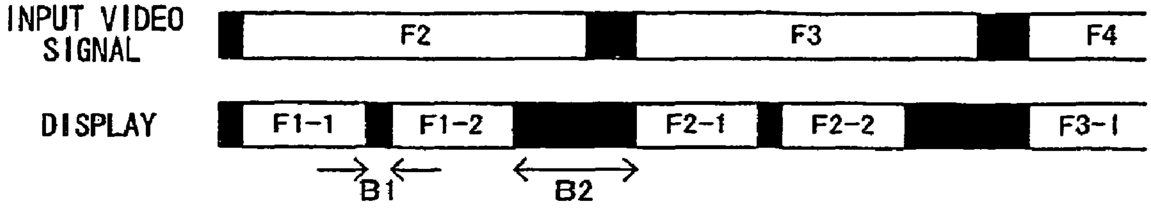
FIG. 5 depicts a configuration of a video signal according to the first embodiment.
Figure 6:
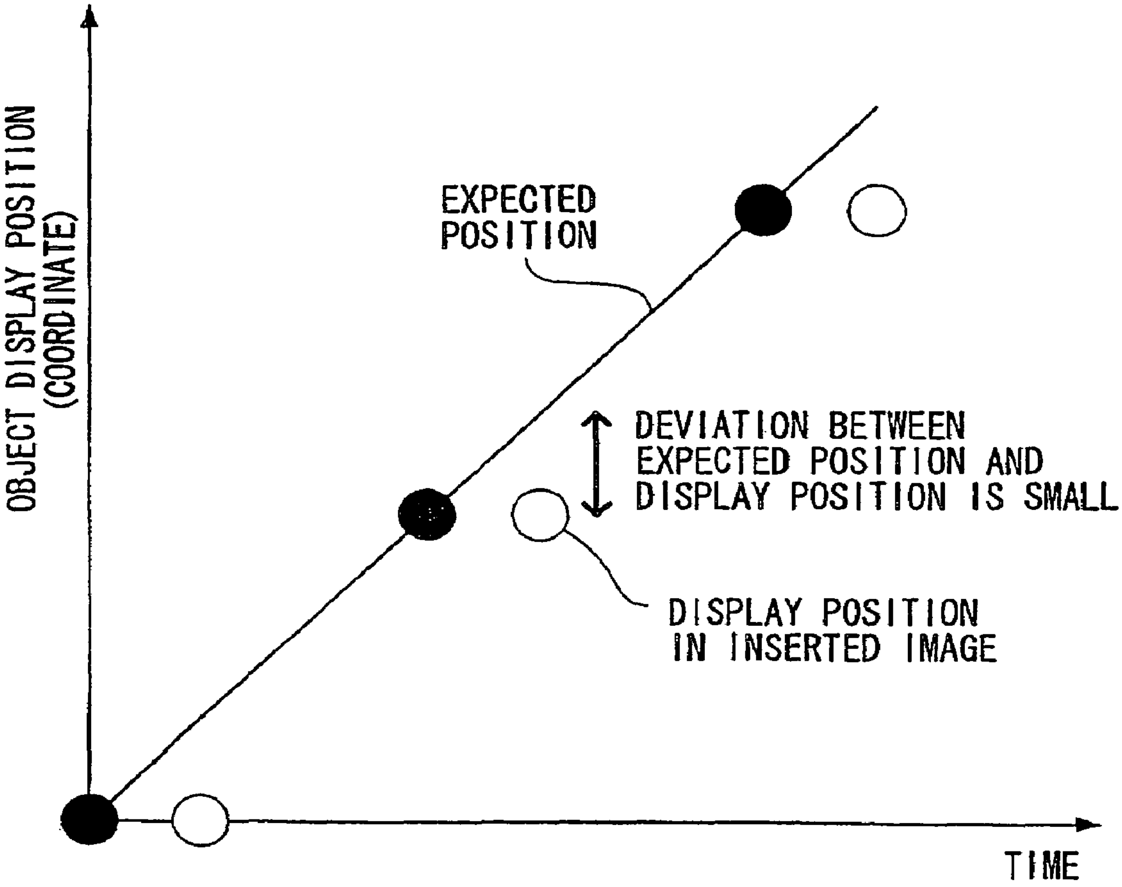
FIG. 6 is a chart that depicts the relationship between a display position and an expected position according to the first embodiment.

The scan driver 2 interlace-scans the scan wirings Dx1 to Dxm. More specifically, the scan driver 2 makes every two lines in selected states simultaneously in order of (Dx1, Dx2), (Dx3, Dx4), (Dx5, Dx6), . . . , and scans the scan wirings so as to shift the scan wirings by as many as two lines. The scan driver 2 then scans the scan wirings in order of (Dx2, Dx3), (Dx4, Dx5), (Dx6, Dx7), By thus displaying the image plane, the input video signal corresponding to a frame (Fn) is divided into video signals corresponding two fields, i.e., an odd numbered field (Fn-1) and an even numbered field (Fn-2) as shown in FIG. 5. Based on these video signals corresponding to the two frames, color and gray-scale image planes are formed independently of each other. The display refresh rate is, therefore, twice as fast as the video signal refresh rate. If the video signal refresh rate is, for example, 60 Hz, the display refresh rate is 120 Hz, thereby reducing flicker on the image planes.

According to this embodiment, as shown in FIGS. 4 and 5, the control circuit 6 controls the output of the video signal or video signals so that a second non-display period B2 set between the end of display of a plurality of images (an image in a field (F1-1) and an image in a field (F1-2)) corresponding to the first input video signal for one vertical scan (a frame (F1), not shown) and the start of display of an image (an image in a field (F2-1)) corresponding to the second input video signal (a frame (F2)) by a next vertical scan is longer than a first non-display period B1 set between the end of display of the image in the field (F1-1) and the start of the image in the field (F1-2). Namely, the control circuit 6 controls the output of the video signal or video signals so that the second non-display period B2 can satisfy the following relationship.

$$B2>(TA-TB)/N$$

In the expression, "TA" denotes a period between the start of display of the image in the field (F1-1) corresponding to the input video signal in the frame (F1) and the start of display of the image in the field (F2-1) corresponding to the image video signal in the frame (F2). "TB" denotes a sum of respective display periods for images in a plurality of fields (field (F1-1) and field (F1-2)) corresponding to the input video signal in the frame (F1). "N" denotes the number of images in fields. By so controlling, the deviation between the expected position of the moving object and the position of the object actually displayed as the image can be reduced, and the artificiality of the motion of the object in the image can be reduced.

The periods B1 and B2 and the image display periods can be appropriately set. If the video signal refresh rate of the input video signal is, for example, 60 Hz, a frame cycle is about 16 ms. In this embodiment, therefore, about 6.0 ms may be allocated to the display periods for each of the two fields, about 0.1 ms may be allocated to the period B1, and about 3.9 ms may be allocated to the period B2, for example.

If the period B1 is shorter and the period B2 is longer, the image moving characteristics are improved. However, if a total of the periods B1 and B2 is longer, the displayed image tends to be darker. Allocation of time to the periods B1 and B2 and the image display periods is preferably set according to characteristics or purposes of the image display apparatus. The period B1 may be zero.

Second Embodiment

In a second embodiment, an input non-interlace video signal corresponding to one frame is duplicated into video signals corresponding to two sub-frames and the video signals corresponding to the respective sub-frames are displayed by the non-interlace scan.

Figure 7:
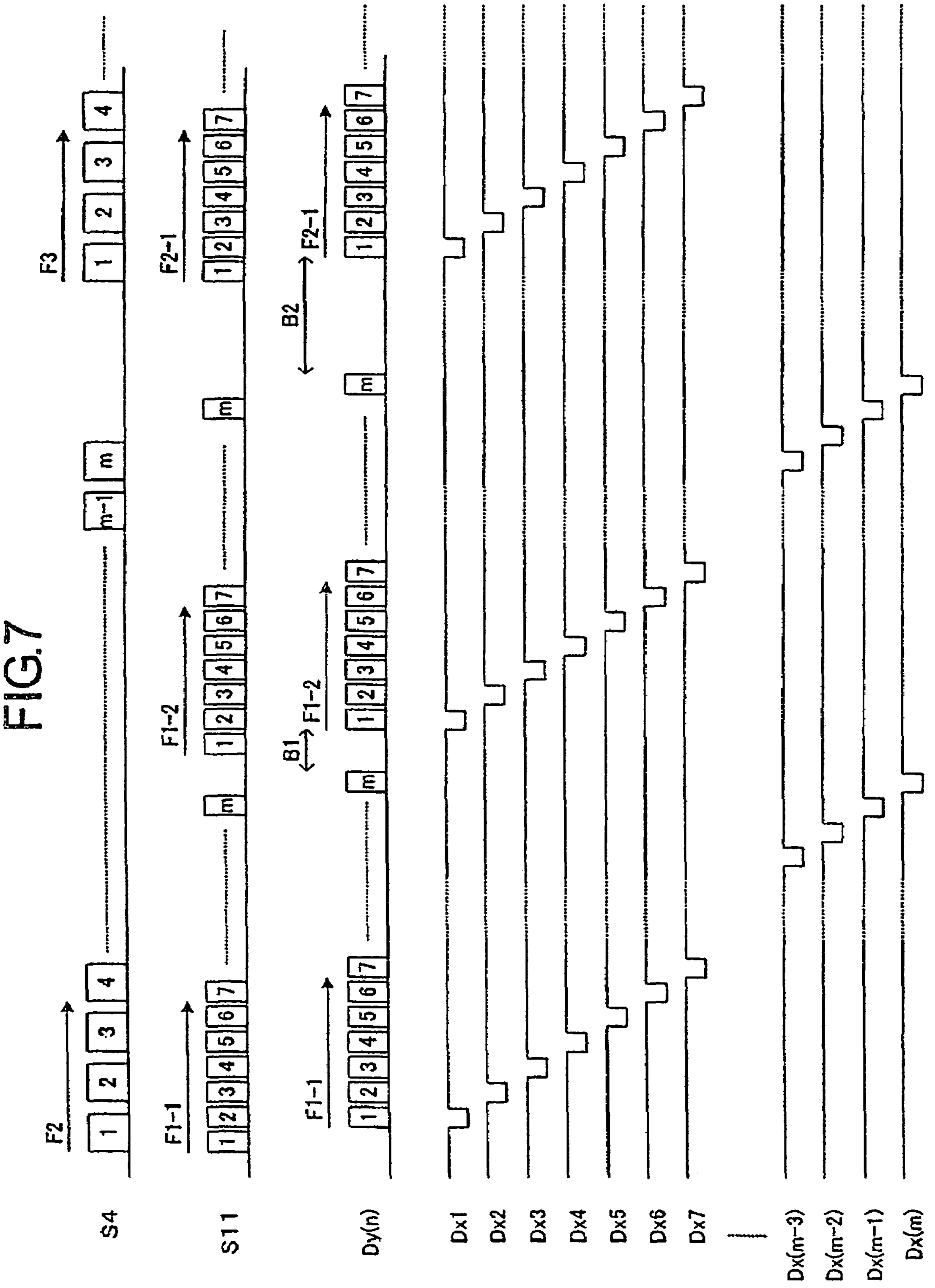
FIG. 7 is a timing chart that depicts a display timing control according to a second embodiment of the present invention.

FIG. 7 is a timing chart that depicts a display timing control according to this embodiment.

The scan line converter 8 temporarily stores the display signal S4 in the frame memory 9, sequentially reads data corresponding to each row from the frame memory 9 in order of (1, 2, 3, 4, 5, . . . , 1, 2, 3, 4, 5, . . . ) by a delay by as much as one frame, and outputs the data as the scan line converted signal S11. At this time, the scan line converter 8 executes reading and output at a rate twice as fast as that for the display signal S4.

The scan driver 2 scans the scan wirings Dx1 to Dxm by one row by one row. More specifically, the scan driver 2 first scans the scan wirings while making the scan wirings in selected states in order of Dx1, Dx2, Dx3, Dx4, . . . , and scans the scan wirings again in order of Dx1, Dx2, Dx3, Dx4, . . . . These scans are performed at a rate twice as fast as that of the scan on the display signal S4.

By thus displaying the image plane, the display refresh rate is twice as fast as the video signal refresh rate. If the video signal refresh rate is, for example, 60 Hz, the display refresh rate is 120 Hz, thereby reducing flicker on the image plane.

According to this embodiment, as shown in FIG. 7, the control circuit 6 controls the output of the video signal or video signals so that the second non-display period B2 set between the end of display of a plurality of images (an image in a sub-frame (F1-1) and an image in a sub-frame (F1-2)) corresponding to the first input video signal for one vertical scan (the frame (F1), not shown) and the start of display of an image (an image in a sub-frame (F2-1)) corresponding to the second input video signal (the frame (F2)) by a next vertical scan is longer than the first non-display period B1 set between the end of display of the image in the sub-frame (F1-1) and the start of the image in the sub-frame (F1-2). Namely, the control circuit 6 controls the output of the video signal or video signals so that the second non-display period B2 can satisfy the following relationship.

$$B2>(TA-TB)/N$$

In the expression, "TA" denotes a period between the start of display of the image in the sub-frame (F1-1) corresponding to the input video signal in the frame (F1) and the start of display of the image in the sub-frame (F2-1) corresponding to the image video signal in the frame (F2) "TB" denotes a sum of respective display periods for images in a plurality of sub-frames (sub-frame (F1-1) and sub-frame (F1-2)) corresponding to the input video signal in the frame (F1) "N" denotes the number of images in sub-frames. By so controlling, the deviation between the expected position of the moving object and the position of the object actually displayed as the image can be reduced, and the artificiality of the motion of the object in the image can be reduced.

With the configuration of this embodiment, the scan lines can be displayed accurately. This embodiment is, therefore, suitable for a high accuracy image display apparatus.

Third Embodiment

In the first embodiment, every two scan wirings are set into selected states during the interlace scan. In a third embodiment, every one scan wiring is set into a selected state. The other configurations are the same as those according to the first embodiment.

Figure 8:
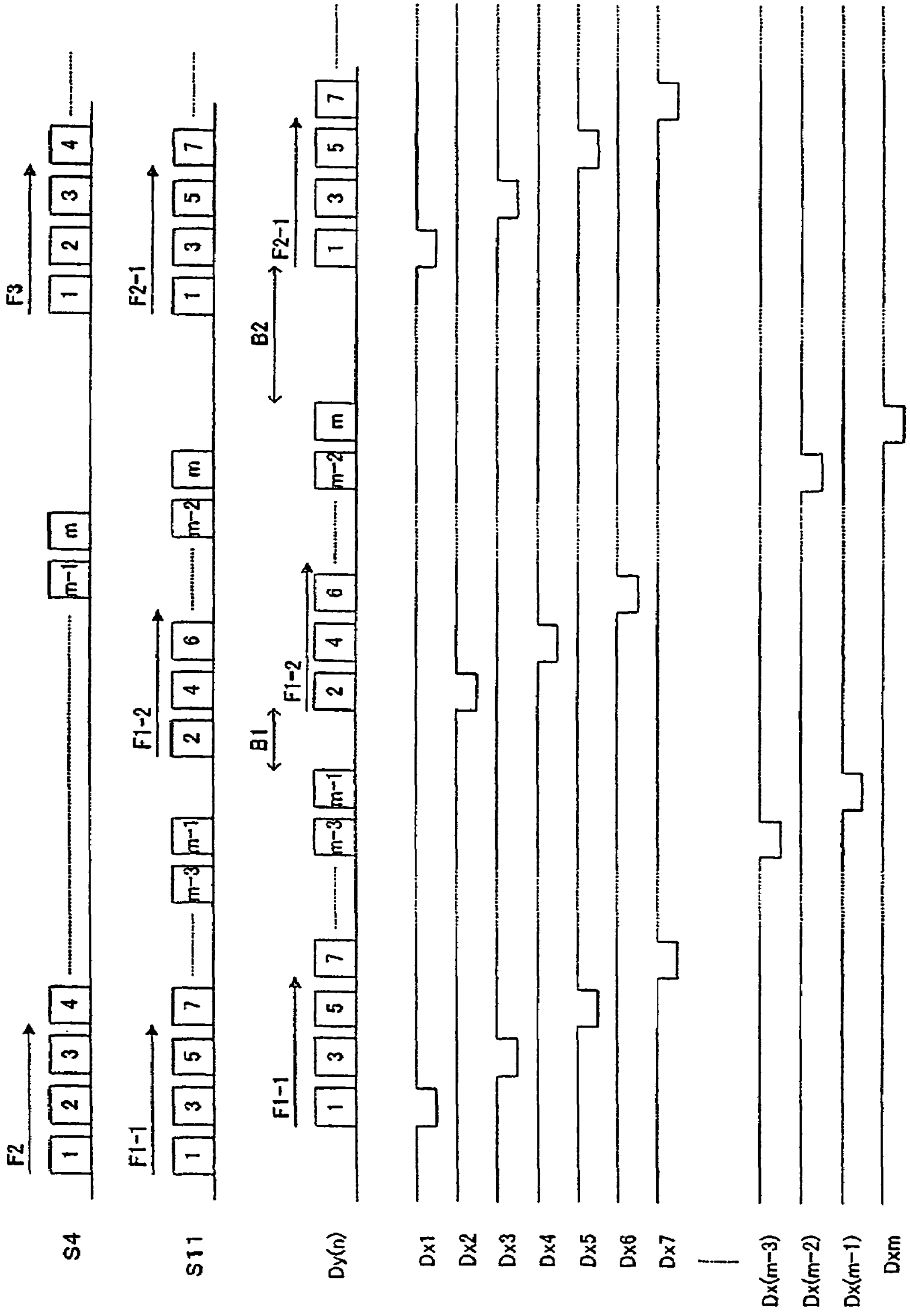
FIG. 8 is a timing chart that depicts a display timing control according to a third embodiment of the present invention.

FIG. 8 is a timing chart that depicts a display timing control according to this embodiment.

The scan line converter 8 temporarily stores the display signal S4 of the non-interlace structure in the frame memory 9, sequentially reads data corresponding to each row from the frame memory 9 in order of (1, 3, 5, 7, 2, 4, 6, 8, . . . ) by a delay by as much as one frame, and outputs the data as the scan line converted signal S11. The scan lines are thereby converted into an interlace structure.

The scan driver 2 makes every one line in selected states in order of Dx1, Dx3, Dx5, . . . , and scans the scan wirings so as to shift the scan wiring by as many as two lines. The scan driver 2 then scans the scan wirings in order of Dx2, Dx4, Dx6, Dx8, . . . .

According to this embodiment, similarly to the first embodiment, the control circuit 6 controls the output of the video signal or video signals. Namely, the control circuit 6 controls the output of the video signal or video signals so that the second non-display period B2 can satisfy the following relationship.

$$B2>(TA-TB)/N$$

In the expression, "TA" denotes a period between the start of display of the image in the field (F1-1) corresponding to the input video signal in the frame (F1) and the start of display of the image in the field (F2-1) corresponding to the image video signal in the frame (F2). "TB" denotes a sum of respective display periods for images in a plurality of fields (field (F1-1) and field (F1-2)) corresponding to the input video signal in the frame (F1). "N" denotes the number of images in fields.

By so configuring, similarly to the first embodiment, the flicker can be reduced and the image moving characteristics can be improved.

Besides, with the configuration of this embodiment, the scan wirings do not overlap within one field. Therefore, a vertical resolution can be advantageously improved, as compared with the first embodiment. In addition, with the configuration of this embodiment, it suffices that a circuit operating rate may be slower than that according to the second embodiment. This embodiment is, therefore, suitable for an instance in which low cost and high accuracy are required.

Fourth Embodiment

In the second embodiment, only one scan wiring is made in the selected state. In a fourth embodiment, by contrast, every two scan wirings are made in selected states during the non-interlace scan. The other configurations are the same as those according to the second embodiment.

Figure 9:
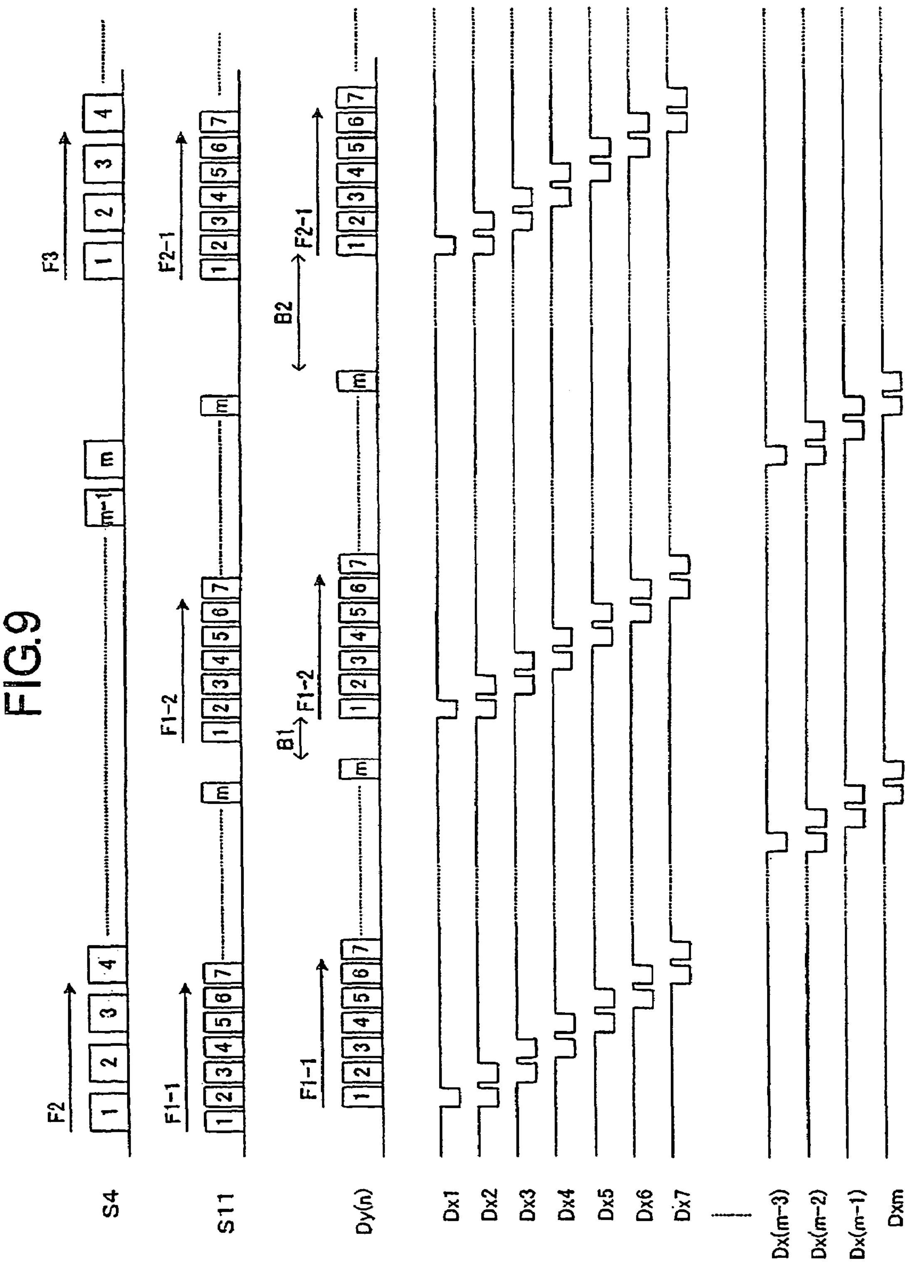
FIG. 9 is a timing chart that depicts a display timing control according to a fourth embodiment of the present invention.

FIG. 9 is a timing chart that depicts a display timing control according to this embodiment.

The scan driver 2 makes every two lines in selected states simultaneously in order of (Dx1, Dx2), (Dx2, Dx3), (Dx3, Dx4), . . . , and scans the scan wirings so as to shift the scan wirings by as many as one line. The scan driver 2 then scans the scan wirings again in order of (Dx1, Dx2), (Dx2, Dx3), (Dx3, Dx4), . . . . Namely, the scan driver 2 scans the scan wirings at a rate twice as fast as that of the scan on the display signal S4 while overlapping the scan wirings.

According to this embodiment, similarly to the second embodiment, the control circuit 6 controls the output of the video signal or video signals. Namely, the control circuit 6 controls the output of the video signal or video signals so that the second non-display period B2 can satisfy the following relationship.

$$B2>(TA-TB)/N$$

In the expression, "TA" denotes a period between the start of display of the image in the sub frame (F1-1) corresponding to the input video signal in the frame (F1) and the start of display of the image in the sub frame (F2-1) corresponding to the image video signal in the frame (F2). "TB" denotes a sum of respective display periods for images in a plurality of sub frames (sub frame (F1-1) and sub frame (F1-2)) corresponding to the input video signal in the frame (F1) "N" denotes the number of images in sub frames.

By so configuring, similarly to the second embodiment, the flicker can be reduced and the image moving characteristics can be improved.

Besides, with the configuration of this embodiment, the scan wirings are repeatedly selected. A luminance of the image plane is advantageously improved. In addition, the scan lines overlap closely, line flicker can be greatly reduced. Since the flicker tends to be obtrusive in a high luminance, large-area image display apparatus, this embodiment is suitable for such an image display apparatus.

Fifth Embodiment

In a fifth embodiment, an interlace video signal is input to the image display apparatus. A video signal corresponding to one field of the interlace video signal is divided into video signals corresponding to two sub-fields, and the video signals corresponding to the respective sub-fields are displayed by the interlace san. Similarly to the first embodiment, the scan wirings are repeatedly selected.

Figure 10:
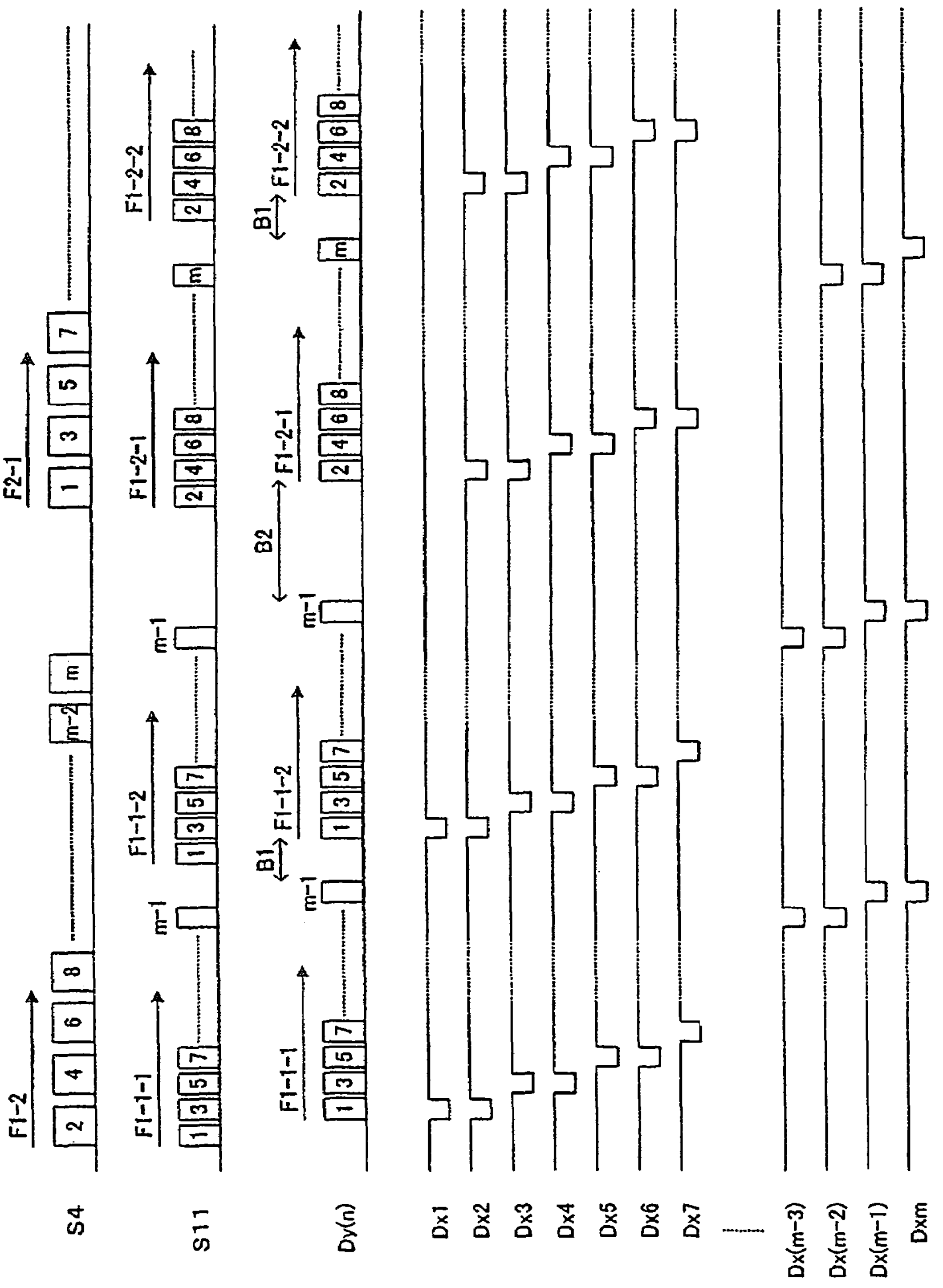
FIG. 10 is a timing chart that depicts a display timing control according to a fifth embodiment of the present invention.

FIG. 10 is a timing chart that depicts a display timing control according to this embodiment.

The scan line converter 8 temporarily stores the display signal S4 of an interlace structure in the frame memory 9, sequentially reads data corresponding to each row from the frame memory 9 in order of (1, 3, 5, 7, . . . , 1, 3, 5, 7, . . . ) by a delay by as much as one field, and outputs the data as the scan line converted signal S11. At this time, the scan line converter 8 executes reading and output at a rate twice as fast as that for the display signal S4.

The scan driver 2 makes every two lines in selected states simultaneously in order of (Dx1, Dx2), (Dx3, Dx4), (Dx5, Dx6), . . . , and scans the scan wirings so as to shift the scan wirings by as many as two lines. The scan driver 2 then scans the scan wirings again in order of (Dx1, Dx2), (Dx3, Dx4), (Dx5, Dx6), . . . . At this time, the scan driver 2 scans the scan wirings at a rate twice as fast as that for the display signal S4.

As for video signals in sub-fields (F1-2-1, F1-2-2) corresponding to the video signal in the next field (F1-2), the scan line converter 8 outputs the scan line converted signals S11 on the respective rows at a rate twice as fast as that for the display signal S4 in order of (2, 4, 6, 2, 4, 6, . . . ). The scan driver 2 first makes every two lines in selected states simultaneously in order of (Dx2, Dx3), (Dx4, Dx5), (Dx6, Dx7), . . . and scans the scan wirings so as to shift the scan wirings by as many as two lines. The scan driver 2 then scans the scan wirings again in order of (Dx2, Dx3), (Dx4, Dx5), (Dx6, Dx7), . . . . At this time, the scan driver 2 scans the scan wirings at a rate twice as fast as that for the display signal S4.

According to this embodiment, the control circuit 6 controls the output of the video signal or video signals so that the second non-display period B2 set between the end of display of a plurality of images (an image in a sub-field (F1-1-1) and an image in a sub-field (F1-1-2)) corresponding to the first input video signal for one vertical scan (a field (F1-1), not shown) and the start of display of an image (an image in a sub-field (F1-2-1)) corresponding to the second input video signal (a field (F1-2)) by a next vertical scan is longer than the first non-display period B1 set between the end of display of the image in the sub-field (F1-1-1) and the start of display of the image in the sub-field (F1-1-2). Namely, the control circuit 6 controls the output of the video signal or video signals so that the second non-display period B2 can satisfy the following relationship.

$$B2>(TA-TB)/N$$

In the expression, “TA” denotes a period between the start of display of the image in the sub-field (F1-1-1) corresponding to the input video signal in the field (F1-1) and the start of display of the image in the sub-field (F1-2-1) corresponding to the image video signal in the field (F1-2). “TB” denotes a sum of respective display periods for images in a plurality of sub-fields (sub-field (F1-1-1) and sub-field (F1-1-2)) corresponding to the input video signal in the field (F1-1). “N” denotes the number of images in sub-fields.

By so configuring, the flicker can be reduced and the image moving characteristics can be improved if the interlace video signal is input, similarly to the preceding embodiments.

Sixth Embodiment

In a sixth embodiment, a display timing control when 3-2 pulldown-converted video signals are input will be described. The 3-2 pulldown conversion means converting an original video signals such that the original video signal for one vertical scan is converted into video signals for three vertical scans, the original video signal for the next one vertical scan is converted into video signals for two vertical scans, and these video signals are alternately arranged. Generally, the 3-2 pulldown conversion means converting a video signal having a video signal refresh rate of 24 Hz into a non-interlaced signal having a video signal refresh rate of 60 Hz or an interlaced signal having a video signal refresh rate of 30 Hz. A 2-3 pulldown conversion is synonymous with the 3-2 pulldown conversion.

According to this embodiment, a non-interlaced video signals having a video signal refresh rate of 60 Hz generated by subjecting an original video signal having a refresh rate of 24 Hz to the 3-2 pulldown conversion is input to an image display apparatus. In an example shown in FIG. 11A, every odd numbered frame of the original video signal is duplicated into two video signals (F1-1, F1-2; F3-1, F3-2; . . . ). In addition, an even numbered frame of the original video signal is duplicated into three video signals (F2-1, F2-2, F2-3; F4-1, F4-2, F4-3; . . . ). It is noted that F1-x represent a video signal of one frame duplicated from the frame F1 in the original video signal.

Figure 11:
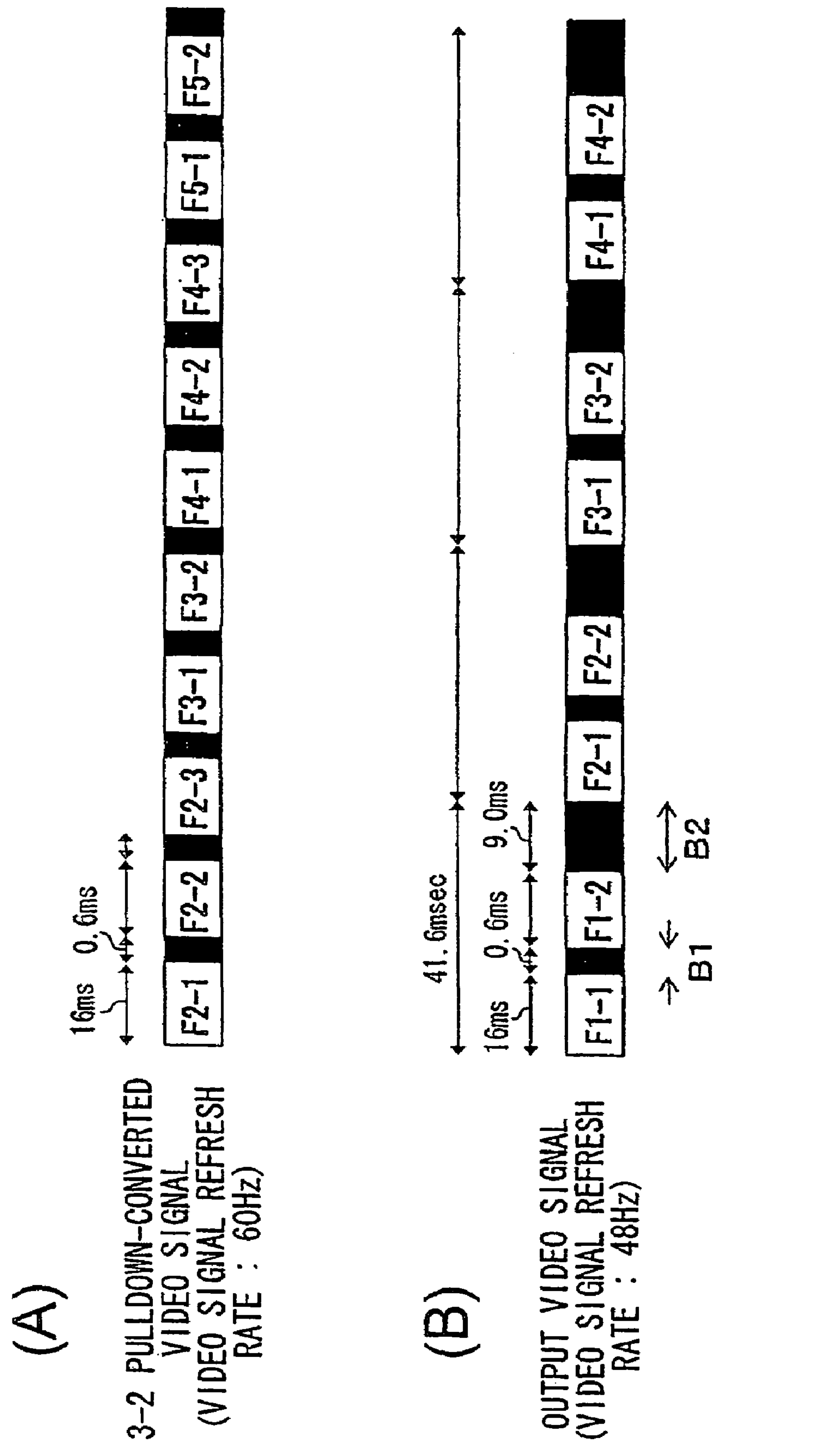
FIG. 11 depicts a configuration of a video signal according to a sixth embodiment of the present invention.

The image processing unit 7 outputs video signals of images to be sequentially displayed by M (where M is an integer) vertical scans fewer than N and corresponding to the video signal for one vertical scan, among the input video signals converted from the original video signal of one frame so as to sequentially display images by N (where N is an integer) vertical scans, to the scan converter 8. Specifically, if video signals of three frames converted from the original video signal of one frame are input, the image processing unit 7 outputs the video signals of two frames among the three frames. If video signals of two frames converted from the original video signal of one frame, the image processing unit 7 outputs the video signals of two frames. Namely, the image processing unit 7 does not output the video signal of one frame out of those of three frames. The non-displayed video signal of one frame may be any one of the three video signals. In this embodiment, it is assumed that the non-displayed video signal is the duplicated video signal of a third frame (F2-3, F4-3, . . . ) In this embodiment, as shown in FIG. 11B, the control circuit 6 controls the output of the video signal or video signals so that the second non-display period B2 set between the end of display of a plurality of images (an image in a frame (F1-1) and an image in a frame (F1-2)) corresponding to the first input video signal for one vertical scan (a frame (F1-1) of the input video signal), and the start of display of an image (an image in a frame (F2-1)) corresponding to the second input video signal for a next vertical scan (the frame (F2-1) of the input video signal) is longer than the first non-display period B1 set between the end of display of the image in the frame (F1-1) and the start of display of the image in the frame (F1-2). Namely, the control circuit 6 controls the output of the video signal or video signals so that the second non-display period B2 can satisfy the following relationship.

$$B2>(TA-TB)/N$$

In the expression, “TA” denotes a period between the start of display of the image in the frame (F1-1) corresponding to the frame (F1) of the input video signal and the start of display of the image in the frame (F2-1) corresponding to the frame (F2) of the image video signal. "TB" denotes a sum of respective display periods for images of a plurality of frames (frame (F1-1) and frame (F1-2)) corresponding to the input video signal of the frame (F1-1). "N" denotes the number of images of frames.

The periods B1 and B2 and the image display periods can be appropriately set. For example, about 0.6 ms may be allocated to the first non-display period B1, about 9.0 ms may be allocated to the second non-display period B2, and about 16.0 ms may be allocated to the display period for an image of one frame.

By thus setting the image display periods and the non-display periods, the artificiality of the motion of the moving object generated in the video displayed based on the 3-2 pulldown-converted video signals can be eliminated.

Seventh Embodiment

In the first to the fifth embodiments, the image corresponding to the input video signal for one vertical scan is displayed by two vertical scans. Alternatively, the image corresponding to the input video signal for one vertical scan can be displayed by three or more vertical scans. In a seventh embodiment, an instance in which video signals of three sub-frames are generated from a non-interlaced video signal of one frame and in which the video signals are displayed by non-interlace scan will be described.

Figure 12:
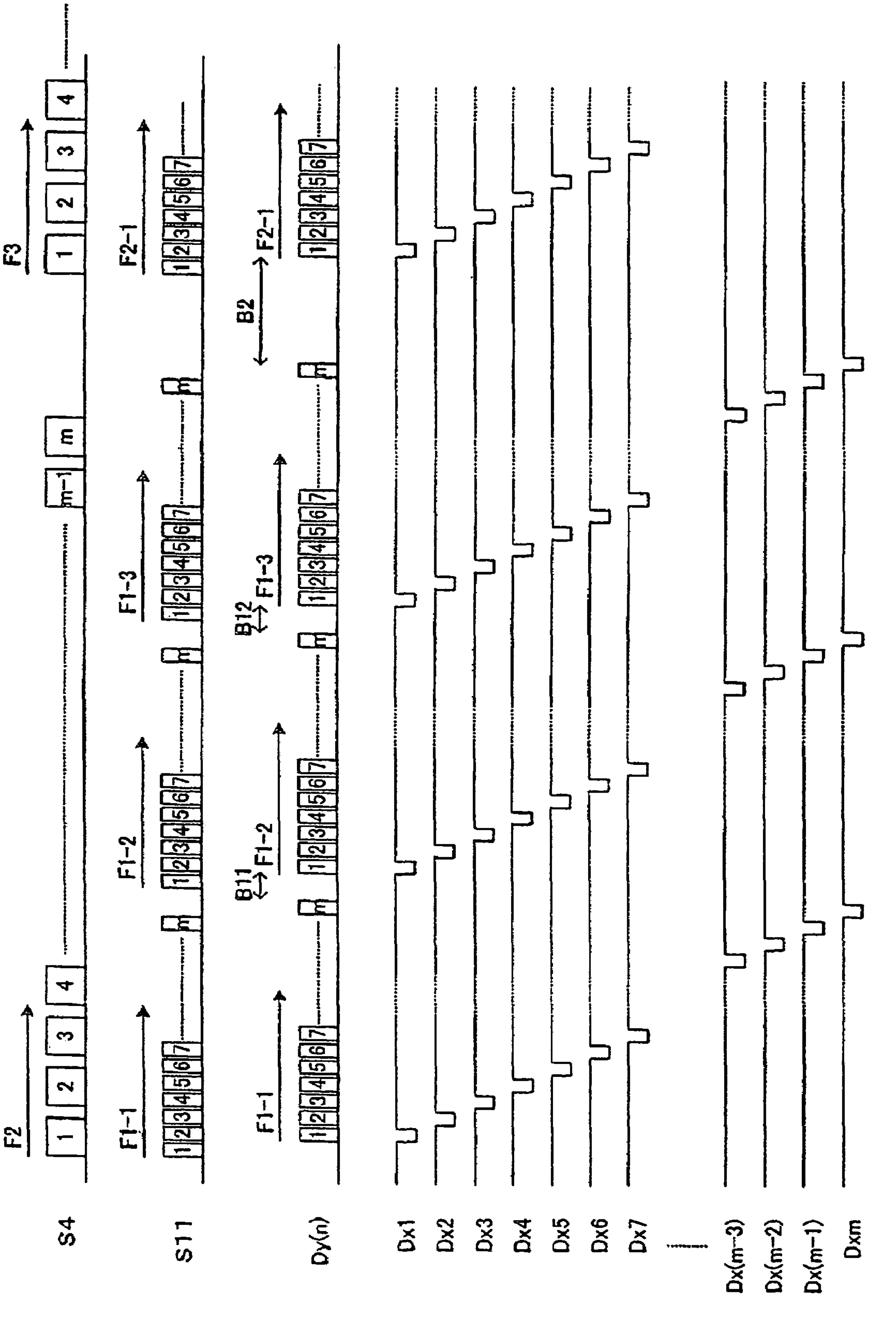
FIG. 12 is a timing chart that depicts a display timing control according to a seventh embodiment of the present invention.

FIG. 12 is a timing chart that depicts a display timing control according to this embodiment.

The scan line converter 8 temporarily stores the display signal S4 in the frame memory 9, sequentially reads data corresponding to each row from the frame memory 9 in order of (1, 2, 3, 4, 5, . . . , 1, 2, 3, 4, 5, . . . , 1, 2, 3, 4, 5, . . . ) by a delay by as much as one frame, and outputs the data as the scan line converted signal S11. The scan line converter 8 executes reading and output at a rate three times as fast as that for the display signal S4.

The scan driver 2 makes scan wirings in selected states in order of Dx1, Dx2, Dx3, Dx4, . . . , and scans the scan wirings. The scan driver 2 then scans the scan wirings in order of Dx1, Dx2, Dx3, Dx4, . . . two more times. At this time, the scan driver 2 scans the scan wirings at a rate three times as fast as that for the display signal S4.

By thus displaying the image plane, the display refresh rate is three times as fast as the video signal refresh rate. For example, even if the video signal has a video signal refresh rate as slow as 24 Hz, the display refresh rate thereof is 72 Hz, thereby reducing flicker on the image plane.

According to this embodiment, the control circuit 6 controls the output of the video signal or video signals so that the second non-display period B2 set between the end of display of a plurality of images (an image of a sub-frame (F1-1), an image of a sub-frame (F1-2), and an image of a sub-frame (F1-3)) corresponding to the first input video signal for one vertical scan (a frame (F1), not shown) and the start of display of an image (an image of a sub-frame (F2-1)) corresponding to the second input video signal (a frame (F2)) by a next vertical scan is longer than the first non-display period B1 set between the end of display of the image of the sub-frame (F1-1) and the start of display of the image of the sub-frame (F1-2) and the first non-display period B1 set between the end of display of the image of the sub-frame (F1-2) and the start of display of the image of the sub-frame (F1-3) Namely, the control circuit 6 controls the output of the video signal or video signals so that the second non-display period B2 can satisfy the following relationship.

$$B2>(TA-TB)/N$$

In the expression, "TA" denotes a period between the start of display of the image of the sub-frame (F1-1) corresponding to the input video signal of the frame (F1) and the start of display of the image of the sub-frame (F2-1) corresponding to the image video signal of the frame (F2). "TB" denotes a sum of respective display periods for a plurality of sub-frames (sub-frame (F1-1), sub-frame (F1-2), and sub-frame (F1-3)) corresponding to the input video signal of the frame (F1). "N" denotes the number of images of sub-frames.

If the video signal frame (refresh) rate is, for example, 24 Hz, about 11 ms may be allocated to each of the display periods for the three sub-frames, about 0.1 ms may be allocated to the first non-display period B1 (about 0.05 ms to each of B11 and B12), and about 8.5 ms may be allocated to the second non-display period B2. By doing so, similarly to the preceding embodiments, the artificiality of the motion can be eliminated.

Eighth Embodiment

In an eighth embodiment, an instance in which a field sequential scan image display apparatus that constitutes a multi-color and gray-scale image by displaying images each of which is displayed by one vertical scan, wherein each of images has a plurality of elements each of which has one of two levels of brightness. The "element" means the smallest component of an image. Each of the elements consists of a different mono-color. An example of such an image display apparatus includes an image display apparatus configured so that plasma display devices including many red, blue, and green pixels, respectively are provided and the devices are driven by a sub-field method.

By setting an image displayed by one vertical scan to have one of two levels of brightness and controlling total time for which the image is turned on by a plurality of vertical scans, a multi-color and gray-scale image corresponding to the input video signal for one vertical scan is constituted.

In addition, a plurality of multi-color and gray-scale images corresponding to the input video signal for one vertical scan are displayed.

Figure 17:
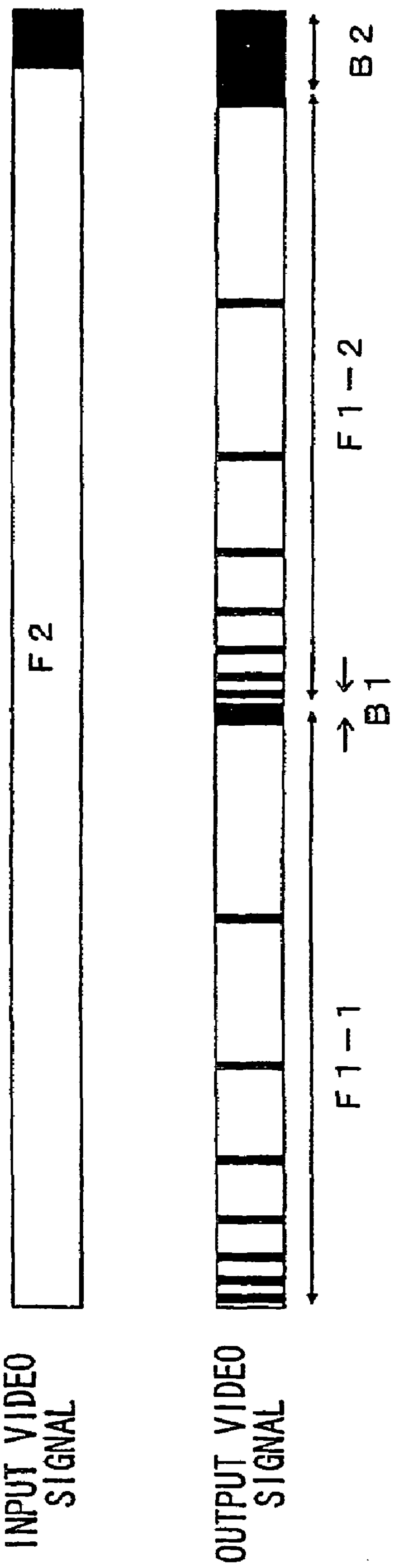
FIG. 17 depicts a configuration of a video signal according to an eighth embodiment of the present invention.

FIG. 17 depicts a configuration of a video signal according to this embodiment.

In FIG. 17, a part colored black corresponds to an image non-display (black display) period and a part colored white corresponds to an image display period.

According to this embodiment, a plurality of multi-color and gray-scale images are displayed based on an output video signal of a plurality of fields (F1-1 and F1-2) corresponding to an input video signal of a frame (F1, not shown). Each of the video signals in the respective fields of the output video signal is configured by video signals for a plurality of vertical scans.

According to this embodiment, the control circuit 6 controls the output of the video signal or video signals so that the second non-display period B2 set between the end of display of a plurality of images (an image in a field (F1-1) and an image in a field (F1-2)) corresponding to the first input video signal for one vertical scan (a frame (F1)) and the start of display of an image (an image in a field (F2-1)) corresponding to the second input video signal (a frame (F2)) by a next vertical scan is longer than a first non-display period B1 set between the end of display of the image in the field (F1-1) and the start of display of the image in the field (F1-2) Namely, the control circuit 6 controls the output of the video signal or video signals so that the second non-display period B2 can satisfy the following relationship.

$$B2>(TA-TB)/N$$

In the expression, "TA" denotes a period between the start of display of the image in the field (F1-1) corresponding to the input video signal in the frame (F1) and the start of display of the image in the field (F2-1) corresponding to the image video signal in the frame (F2). "TB" denotes a sum of respective display periods for images in a plurality of fields (field (F1-1) and field (F1-2)) corresponding to the input video signal in the frame (F1). "N" denotes the number of images in fields. By so controlling, similarly to the preceding embodiments, the deviation between the expected position of the moving object and the position of the object actually displayed as the image can be reduced, and the artificiality of the motion of the object in the image can be reduced.

Ninth Embodiment

In a ninth embodiment, an instance in which a color sequential display type image display apparatus that constitutes a multi-color and gray-scale image by combining a plurality of monochrome images at time series displays an image will be described. An example of such an image display apparatus includes a liquid crystal display apparatus of a color light source type that uses a combination of, for example, three primary color light sources that can be sequentially turned on and that performs impulse display. An image displayed by one vertical scan consists of a monochrome (pixels constituting one image are equal in color). By combining colors (e.g., three primary colors of red, blue, and green) of images displayed by a plurality of vertical scans, a multi-color and gray-scale image corresponding to an input video signal for one vertical scan is constituted.

Figure 18:
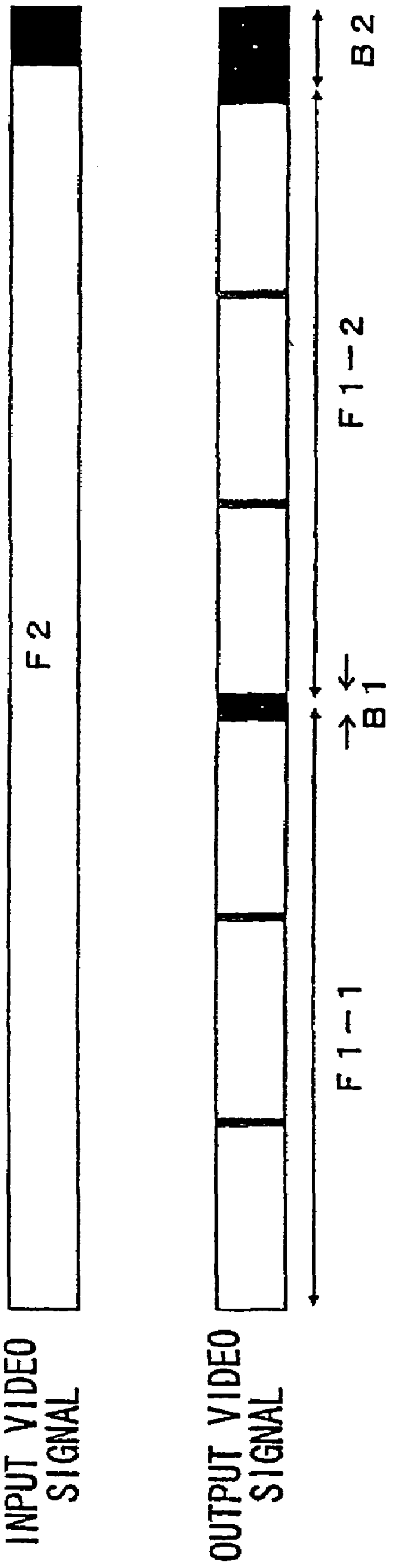
FIG. 18 depicts a configuration of a video signal according to a ninth embodiment of the present invention.

FIG. 18 depicts a configuration of a video signal according to this embodiment.

In FIG. 18, a part colored black corresponds to an image non-display (black display) period and a part colored white corresponds to an image display period.

According to this embodiment, the control circuit 6 controls the output of the video signal or video signals so that the second non-display period B2 set between the end of display of a plurality of images (an image in a field (F1-1) and an image in a field (F1-2)) corresponding to the first input video signal for one vertical scan (a frame (F1)) and the start of display of an image (an image in a field (F2-1)) corresponding to the second input video signal (a frame (F2)) by a next vertical scan is longer than a first non-display period B1 set between the end of display of the image in the field (F1-1) and the start of display of the image in the field (F1-2). Namely, the control circuit 6 controls the output of the video signal or video signals so that the second non-display period B2 can satisfy the following relationship.

$$B2>(TA-TB)/N$$

In the expression, "TA" denotes a period between the start of display of the image in the field (F1-1) corresponding to the input video signal in the frame (F1) and the start of display of the image in the field (F2-1) corresponding to the image video signal in the frame (F2) "TB" denotes a sum of respective display periods for images in a plurality of fields (field (F1-1) and field (F1-2)) corresponding to the input video signal in the frame (F1). "N" denotes the number of images in fields. By so controlling, similarly to the preceding embodiments, the deviation between the expected position of the moving object and the position of the object actually displayed as the image can be reduced, and the artificiality of the motion of the object in the image can be reduced.

Tenth Embodiment

Figure 13:
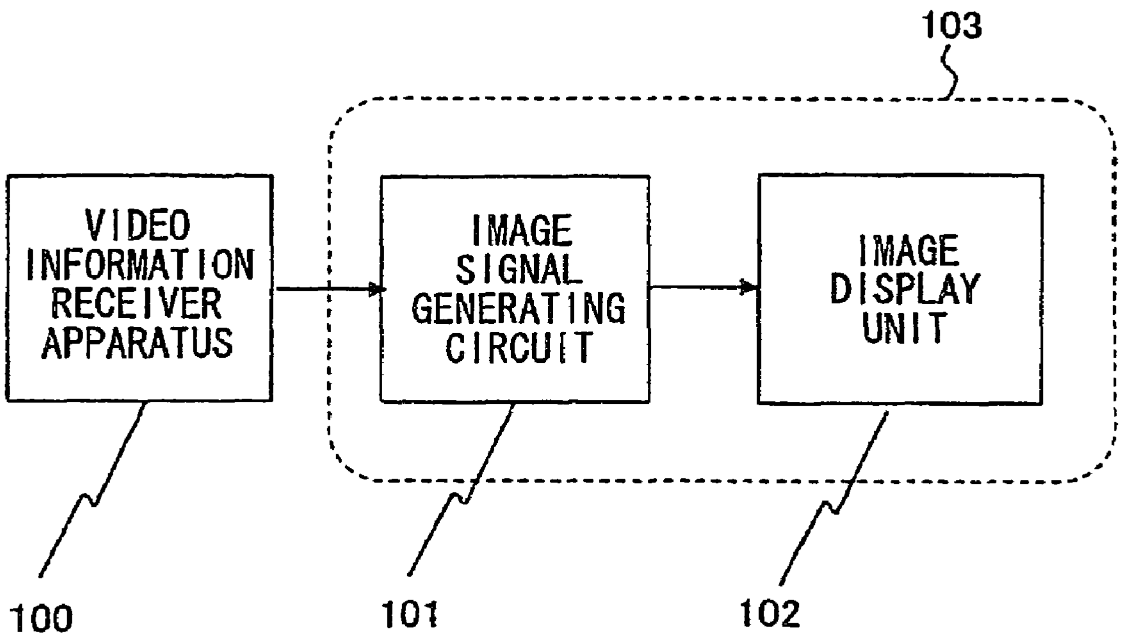
FIG. 13 is a block diagram that depicts a configuration of a video receiving and display apparatus according to a tenth embodiment of the present invention.
Figure 14:
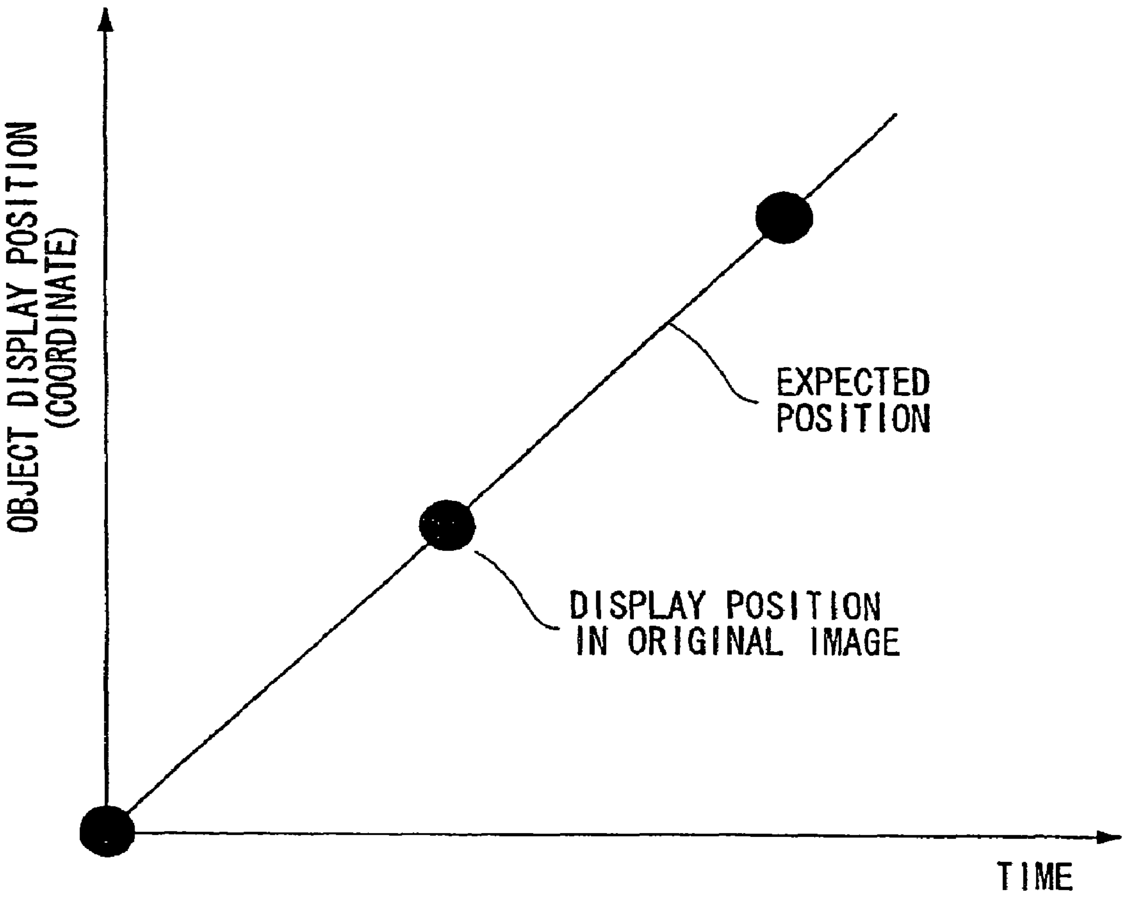
FIG. 14 is a chart that depicts the relationship between a display position and an expected position in a normal display.

FIG. 13 depicts an example of a video receiving and display apparatus that can be configured using the image display apparatus described in each of the preceding embodiments. In FIG. 13, the video receiving and display apparatus includes a video information receiver apparatus 100, an image signal generating circuit 101, and an image display unit 102. In a tenth embodiment, the image signal generating circuit 101 and the image display unit 102 are generically referred to as "image display apparatus 103".

A video signal received by the video information receiver apparatus 100 is input to the image signal generating circuit 101. The image signal generating circuit 101 generates a video signal suited for the image display unit 102 based on the received video signal, and inputs the generated video signal to the image display unit 102. The image display unit 102 displays an image based on the input video signal.

An example of the video information receiver apparatus 100 includes a receiver, such as a tuner, capable of selecting and receiving video broadcasts or the like via wireless broadcasting, wired broadcasting, or the Internet. In addition, a sound device or the like can be connected to the video information receiver apparatus 100, and the sound device or the like, the video information receiver apparatus 100, and the image signal generating circuit 101, and the image display unit 102 can constitute a television set. The video information receiver apparatus 100 may be housed, as a set-top box (STB), in a different housing from a housing that stores the image display apparatus 103 or housed in the same housing as that houses the image display apparatus 103.

In the embodiments, the image display apparatus is configured to read the video signal temporarily stored in the frame memory 9 by the one-frame delay. The signal S11 is delayed by one frame from the signal S4. Alternatively, the image display apparatus according to the present invention may be configured to read the video signal from the frame memory 9 by a delay by as much as one frame or more.

This application claims priority from Japanese Patent Application No. 2004-293275 filed Oct. 6, 2004, which is hereby incorporated by reference.

What is claimed is:

1. An image display apparatus comprising:

a display panel that includes a plurality of pixels different in color, and that can display a multi-color and gray-scale image by one vertical scan;

a video signal output circuit that outputs video signals, for a plurality of images sequentially displayed by a plurality of vertical scans, corresponding to an input video signal for one vertical scan; and a control circuit that controls an output of said video signals so that a non-display period TC set between an end of display of a plurality of images corresponding to a first input video signal for one vertical scan and a start of display of an image corresponding to a second input video signal for a next one vertical scan can satisfy a relationship:

$$TC>(TA-TB)/N,$$

where TA denotes a period between the start of the display of said plurality of images corresponding to said first input video signal and the start of the display of said image corresponding to said second input video signal, TB denotes a sum of display periods for said respective plurality of images corresponding to said first input video signal, and N denotes the number of said plurality of images corresponding to said first input video signal.

2. An image display apparatus according to claim 1, wherein the number of said N is 2.

3. An image display apparatus according to claim 1, wherein the display periods for said respective plurality of images are equal.

4. An image display apparatus according to claim 1, wherein said input video signal for one vertical scan is a non-interlaced video signal, and said video signal output circuit divides or duplicates said input video signal for one vertical scan, and thereby outputs the video signals, for said plurality of images, corresponding to said input video signal for one vertical scan.

5. The image display apparatus according to claim 1, wherein said input video signal for one vertical scan is an interlaced video signal, and said video signal output circuit duplicates said input video signal for one vertical scan, and thereby outputs the video signals, for said plurality of images, corresponding to said input video signal for one vertical scan.

6. The image display apparatus according to claim 1, wherein said input video signal for one vertical scan is a video signal for one vertical scan generated by combining video signals for a plurality of vertical scans, and said video signal output circuit divides or duplicates said input video signal for one vertical scan, and thereby outputs the video signals, for said plurality of images, corresponding to said input video signal for one vertical scan.

7. The image display apparatus according to claim 1, wherein said input video signal is a video signal converted from an original video signal for one vertical scan so as to be able to sequentially display a plurality of images by n vertical scans, where n is an integer, and said video signal output circuit outputs video signals, for images sequentially displayed by m vertical scans, corresponding to said input video signal for one vertical scan, where m is an integer and smaller than n.

8. The image display apparatus according to claim 1, wherein said input video signal is a video signal configured so that video signals for three vertical scans converted from an original video signal for one vertical scan and video signals for two vertical scans converted from the original video signal for one vertical scan are alternately arranged, and said video signal output circuit outputs video signals, for images sequentially displayed by two vertical scans, corresponding to the video signals for three vertical scans converted from the original video signal for one vertical scan, and outputs video signals, for images sequentially displayed by two vertical scans, corresponding to the video signals for the two vertical scans converted from the original video signal for the one vertical scan.

9. A video receiving and display apparatus comprising:

the image display apparatus according to claim 1; and a video information receiver apparatus that receives a video signal obtained through a wireless broadcasting, a wired broadcasting or the Internet, and that outputs the video signal to said image display apparatus.

10. An image display apparatus comprising:

a display panel that includes a plurality of pixels different in color, and that can form a multi-color and gray-scale image by displaying images each of which is displayed by one vertical scan, wherein each of images has a plurality of elements each of which has one of two levels of brightness;

a video signal output circuit that outputs video signals, for a plurality of multi-color and gray-scale images, corresponding to an input video signal for one vertical scan; and a control circuit that controls an output of said video signals so that a non-display period TC set between an end of display of a plurality of multi-color and gray-scale images corresponding to a first input video signal for one vertical scan and a start of display of a multi-color and gray-scale image corresponding to a second input video signal for a next one vertical scan can satisfy a relationship:

$$TC>(TA-TB)/N,$$

where TA denotes a period between the start of the display of said plurality of images corresponding to said first input video signal and the start of the display of said image corresponding to said second input video signal, TB denotes a sum of display periods for said respective plurality of images corresponding to said first input video signal, and N denotes the number of said plurality of images corresponding to said first input video signal.

11. A video receiving and display apparatus comprising:

the image display apparatus according to claim 10; and a video information receiver apparatus that receives a video signal obtained through a wireless broadcasting, a wired broadcasting or the Internet, and that outputs the video signal to said image display apparatus.

12. An image display apparatus comprising:

a display panel that can display a monochrome image by one vertical scan, and that can form a multi-color and gray-scale image by displaying a plurality of monochrome images each of which has different color;

a video signal output circuit that outputs video signals, for a plurality of multi-color and gray-scale images, corresponding to an input video signal for one vertical scan; and a control circuit that controls an output of said video signals so that a non-display period TC set between an end of display of a plurality of multi-color and gray-scale images corresponding to a first input video signal for one vertical scan and a start of display of a multi-color and gray-scale image corresponding to a second input video signal for a next one vertical scan can satisfy a relationship:

$$TC>(TA-TB)/N,$$

where TA denotes a period between the start of the display of said plurality of images corresponding to said first input video signal and the start of the display of said image corresponding to said second input video signal, TB denotes a sum of display periods for said respective plurality of images corresponding to said first input video signal, and N denotes the number of said plurality of images corresponding to said first input video signal.

13. A video receiving and display apparatus comprising:

the image display apparatus according to claim 12; and a video information receiver apparatus that receives a video signal obtained through a wireless broadcasting, a wired broadcasting or the Internet, and that outputs the video signal to said image display apparatus.

* * * * *

UNITED STATES PATENT AND TRADEMARK OFFICE

CERTIFICATE OF CORRECTION

PATENT NO. : 7,425,996 B2
APPLICATION NO. : 11/242828
DATED : September 16, 2008

INVENTOR(S) : Muneki Ando

It is certified that error appears in the above-identified patent and that said Letters Patent is hereby corrected as shown below:

COLUMN 1
Line 9, "corresponding" should read --corresponding to--.
Line 59, "($F_3$)" should read --(F3)--.

COLUMN 5
Line 60, "an" should read --a--.
Line 61, "an" should read --a--.

COLUMN 6
Line 26, "applies an" should read --applies a--.

COLUMN 10
Line 49, "on an" should read --on a--.

COLUMN 11
Line 55, "(Dx6, Dx7)" should read --(Dx6, Dx7), … .-- and "By" should start a new paragraph.
Line 57, "corresponding" should read --corresponding to--.

COLUMN 13
Line 26, "(F2)" should read --(F2).--.
Line 29, "(F1)" should read --(F1).--.
Line 51, "(1,3,5,7," should read --(1,3,5,7,…,--.

COLUMN 14
Line 55, "(F1)" should read --(F1).--.

COLUMN 15
Line 8, "san" should read --scan--.
Line 31, "(2,4,6,2,4,6,…)" should read --(2,4,6,…,2,4,6,…)--.

COLUMN 16
Line 5, "The" should start a new paragraph.
Line 47, "(F2-3, F4-3,…)" should read --(F2-3, F4-3,…).-- and "In" should start a new paragraph.

UNITED STATES PATENT AND TRADEMARK OFFICE

CERTIFICATE OF CORRECTION

PATENT NO. : 7,425,996 B2 
APPLICATION NO. : 11/242828
DATED : September 16, 2008
INVENTOR(S) : Muneki Ando It is certified that error appears in the above-identified patent and that said Letters Patent is hereby corrected as shown below:

COLUMN 17
Line 66, "(F1-3)" should read --(F1-3).--.

COLUMN 19
Line 63, "(F2)" should read --(F2).--.

Signed and Sealed this

Seventeenth Day of February, 2009

JOHN DOLL
*Acting Director of the United States Patent and Trademark Office*